(12) United States Patent
Hasegawa

(10) Patent No.: US 6,437,911 B1
(45) Date of Patent: Aug. 20, 2002

(54) OBJECTIVE CHANGING-OVER APPARATUS

(75) Inventor: Kazuhiro Hasegawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/660,887

(22) Filed: Sep. 13, 2000

(30) Foreign Application Priority Data

Sep. 16, 1999 (JP) .......................................... 11-262479
Aug. 31, 2000 (JP) ...................................... 2000-264370

(51) Int. Cl.⁷ ............................................. G02B 21/00
(52) U.S. Cl. ...................... 359/381; 359/368; 359/821
(58) Field of Search ................................. 359/368, 381, 359/384, 380, 656, 672, 699, 700, 703, 822, 821

(56) References Cited

U.S. PATENT DOCUMENTS 2,103,573 A * 12/1937 Wilkinson .................. 359/821
5,617,260 A * 4/1997 McNiven et al. ........... 359/381
6,266,118 B1 * 5/2001 Koyama et al. ............ 359/380
6,268,958 B1 * 7/2001 Furuhashi ................... 359/381

FOREIGN PATENT DOCUMENTS

JP   5-281457   10/1993
JP   7-311343   11/1995

* cited by examiner

Primary Examiner—Cassandra Spyrou
Assistant Examiner—Mark A. Robinson
(74) Attorney, Agent, or Firm—Frishauf, Holtz, Goodman & Chick, P.C.

(57) ABSTRACT

The objective changing-over apparatus of the present invention mounted on a microscope, for changing over two objectives on the microscope optical axis by electric power using a driving source comprises a rotation member to fit the two objectives, and two abutting members for limiting the rotation range of the rotation member, a transmission mechanism having a rotation area including a transmission area for transmitting the force and larger than the rotation range of the rotation member limited by the abutting member, for transmitting the force from the driving source to the rotation member by the transmission area.

6 Claims, 19 Drawing Sheets

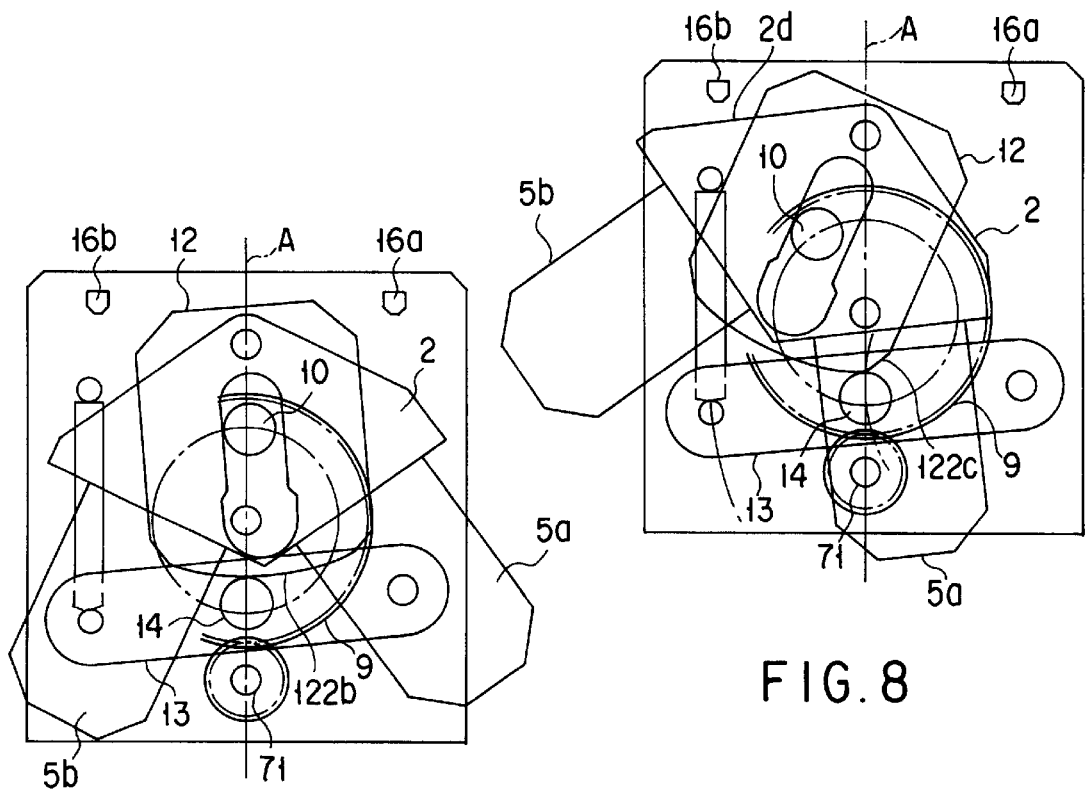
FIG. 7
FIG. 8
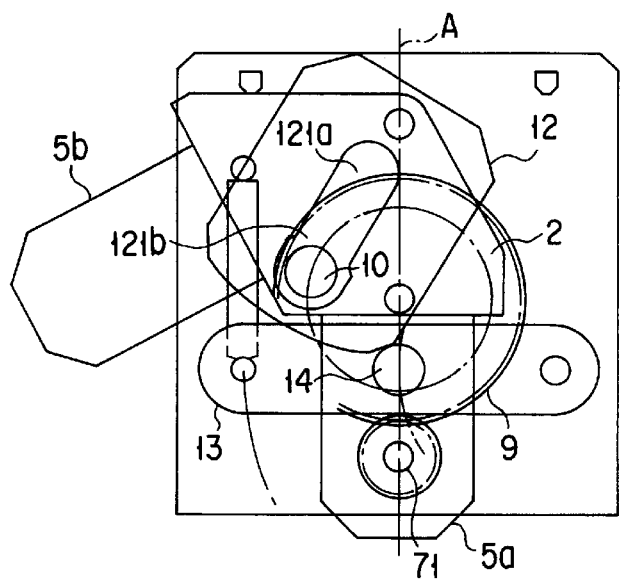
FIG. 9

OBJECTIVE CHANGING-OVER APPARATUS

CROSS-REFERENCE TO RELATED APPLICATIONS

This application is based upon and claims the benefit of priority from the prior Japanese Patent Applications No. 11-262479, filed Sep. 16, 1999; and No. 2000-264370, filed Aug. 31, 2000, the entire contents of which are incorporated herein by reference.

BACKGROUND OF THE INVENTION

The present invention relates to an objective changing-over apparatus, applied to a microscope or other optical instruments, for selecting an objective of desired magnification, according to the object of observation among a plurality of objectives, and positioning on the observation optical path by electric power.

Conventionally, in this type of apparatus, the revolver movable section is rotated by driving a motor with a predetermined voltage, and the rotation of the revolver movable section is stopped by placing a mechanical engagement mechanism between the revolver movable section and the fixed section. This engagement mechanism mechanically engages, positions and holds the revolver movable section and the fixed section, each time when the optical axis of the respective objectives attached to the revolver movable section comes to a position in agreement with the observation optical path of a microscope or other optical instruments.

FIG. 34 shows the configuration of a click mechanism which is an example of engagement mechanism applied to the conventional objective changing-over apparatus, and FIG. 35 is a view along X of FIG. 34. In this click mechanism, a ball 203 is fixed on a leaf spring 202 provided on a fixed section 201, and triangular pyramid shape engaging holes 206a, 206b are provided on the revolver movable section 205 with objectives 204a, 204b. The positions of ball 203 and engagement hole 206a, 206b are adjusted to a height generating a stress in the leaf spring 202 when the ball 203 is positioned at the engagement hole 206a or 206b. Thus, the position of the revolver movable section 205 is reproduced by introducing the ball 203 into the engagement holes 206a, 206b by the elastic force of the leaf spring 202.

Moreover, for example, Jpn. Pat. Appln. KOKAI Publication No. 5-281457 discloses an apparatus that can be used as microscope revolver rotation apparatus or the like, for driving a revolution body (revolver movable section) with a plurality of objectives, and for disposing each objective selectively at a reference position. This apparatus outputs a motor stop signal when motor stop state is detected by a sensor, and after the motor stop signal is output from this sensor, detects the suspension of motor stop signal from the sensor after a predetermined time by a transmission type sensor, and rotates the motor for a very short time by an electronic control circuit.

In the aforementioned conventional apparatus, mounting state of objective to the revolver movable section (quantity, type, attachment position) is different according to the user operation conditions. Consequently, as the load to the motor driving the revolver movable section also changes, it is difficult to perform an optimal motor stop control.

Besides, as the motor or driving section, and the revolver movable section are connected without clearance, the motor stop position is required to be precise. Therefore, a delicate adjustment is required for means of electrically detecting motor stop position, and a complex control is required for braking means of motor driving source.

Repeated use provokes abrasion, resulting in worse position reproductively or leaf string damage, because the click mechanism is deprived of sliding between leaf spring and ball.

As for the swing type objective changing-over apparatus (revolver) presenting an improved manipulatability for marking abnormal sites on a sample, a large force is required for regulating the rotational force and keeping the position, as the objective retracted from the optical axis makes an angle of about 60 degrees with respect to the optical axis, while the click mechanism requires a large clearance and, in addition, provokes a big impact during the positioning.

BRIEF SUMMARY OF THE INVENTION

The present invention has an object to provide an objective changing-over apparatus of simple configuration, that can be assembled and adjusted easily, for securely performing objective changeover with a simple control, independently of its mounting state variation.

The objective changing-over apparatus of the present invention mounted on a microscope, for changing over two objectives on the microscope optical axis by electric power using a driving source comprises a rotation member to fit the two objectives, and two abutting members for limiting the rotation range of the rotation member, a transmission mechanism having a rotation area including a transmission area for transmitting the force and larger than the rotation range of the rotation member limited by the abutting member, for transmitting the force from the driving source to the rotation member by the transmission area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4, 5, 6, 7, 8, and 9 show the operation of the objective changing-over apparatus and show a state viewed from the arrow B direction of FIG. 2;

DETAILED DESCRIPTION OF THE INVENTION

Figure 1:
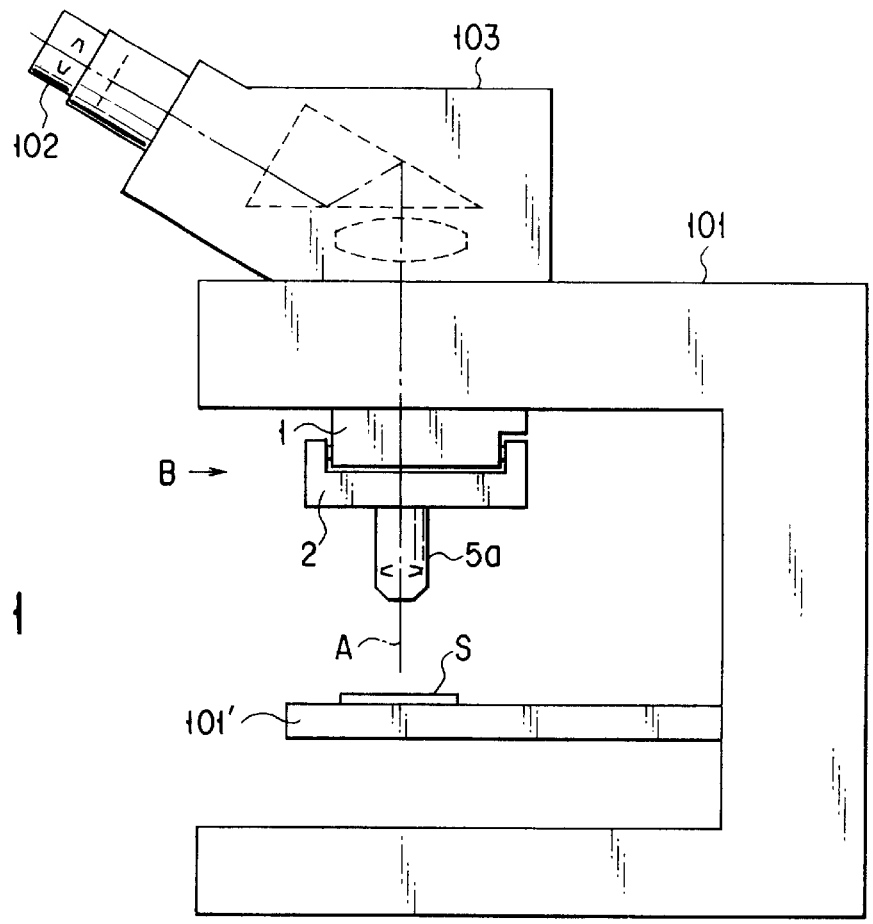
FIG. 1 shows the configuration of a microscope to which an objective changing-over apparatus according to the embodiment of the present invention.

FIG. 1 shows the configuration of a microscope to which an objective changing-over (changeover) apparatus according to a first embodiment of the present invention is applied. As shown in FIG. 1, an attachment member 1 of this objective changing-over apparatus is fixed to a microscope body 101 by dovetail mechanism. Moreover, the microscope body 101 is provided with a lens-barrel 103 with an eyepiece 102, and a stage 101' for placing an observation sample S. The attachment member 1 of this objective changing-over apparatus supports a rotation member 2, as mentioned below, and the rotation member 2 is mounted with an objective 5a (and objective 5b) to be positioned on the observation optical axis A.

Figure 2:
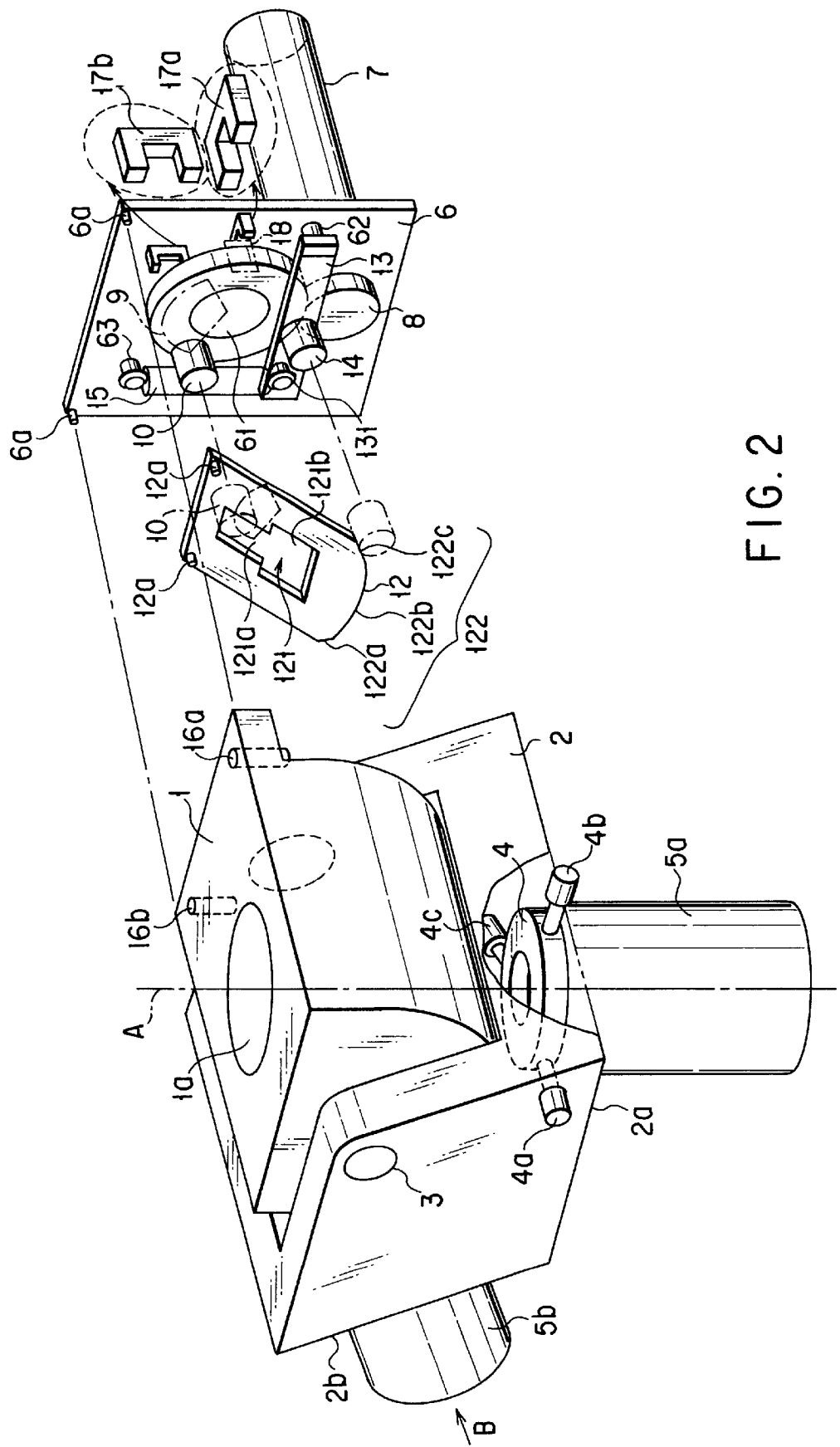
FIG. 2 is an exploded perspective view showing the configuration of the objective changing-over apparatus.

FIG. 2 is an exploded perspective view showing the configuration of the objective changing-over apparatus. The upper surface of the attachment member 1 is attached to the body 101 of the optical device such as the above microscope by dovetail mechanism. An opening 1a is provided on the attachment member 1 at the position of the observation optical axis A, and the rotation member 2 is rotatably (slidably) supported with respect to the attachment member 1, via a rotation shaft 3 and a bearing not shown.

Objectives 5a, 5b are respectively attached to two sides 2a, 2b of the rotation member 2. The side 2a is provided with an objective alignment mechanism, and deviation of two objectives when they are changed over can be prevented by adjusting the alignment with respect to the objective of the other side 2b.

This alignment mechanism includes a screw section for attaching the objective and a hole for transmitting light beam, and comprises a mount 4 held movably in a plan orthogonal to the objective optical axis with respect to the rotation member 2, two adjusting screws 4a, 4b for aligning this mount 4 and a plunger 4c for pressing the mount 4 against these adjusting screws. The position of the mount 4 pressed by the plunger 4c can by adjusted and aligned through the adjustment of adjusting screw projection by turning the adjusting screws 4a, 4b. Besides, a screw section for attaching the objective 5b directly to the rotation member 2 is formed. Moreover, the rotation shaft 3 is disposed normal to the observation optical axis A, in order to space the objective other than the one used for the observation apart from the observation specimen S.

A mechanism section base 6 is attached to the attachment member 1 via screws 6a, 6b. A DC geared motor 7 to be a power source is attached to the back of the mechanism section base 6. The output shaft (71 mentioned below) of the DC geared motor 7 passes through the mechanism section base 6 rotatably, and a motor gear 8 for power transmission is attached to the output shaft (71) extremity protruding across the surface of the mechanism section base 6.

A support shaft 61 is provided on the surface of the mechanism section base 6, and a transmission gear 9 is rotatably supported by this support shaft 61. The transmission gear 9 meshes with the motor gear 8. In addition, a driving pin 10 for transmitting power to the rotation member 2 is attached to the transmission gear 9.

A cam 12 is mounted integrally on the rotation member 12 via screws 12a, 12a. The cam 12 is provided with an opening 121, and this opening 121 comprises a transmission section 121a and an insensitive area 121b. A driving pin 10 is inserted into the opening 121 of the cam 12 and the power is transmitted from the driving pin 10 to the cam 12, with the driving pin 10 positioned at the transmission section 121a. Here, the width of the transmission section 121a is slightly larger than that of the driving pin 10, and the width of the insensitive area 121b is larger than that of the transmission section 121a. A bearing (now shown) is mounted about the driving pin 10, in order to reduce contact resistance with the cam 12.

Further, a support shaft 62 is provided on the surface of the mechanism section base 6, and a link 13 is rotatably supported by this support shaft 62. A bias pin 14 is provided at the middle section of the link 13, and the circumferential surface of this bias pin 14 comes in contact with an outer circumference 122 of the cam 12. In other words, one end of the link 13 is supported by the support shaft 62, in order to bias the outer circumference 122 of the cam 12 via the bias pin 14.

On the other hand, a support member 63 is disposed on the surface of the mechanism section base 6, and one end of a tensile spring 15 is attached to this support member 63. The other end of this tensile spring 15 is attached to an support member 131 disposed on the back of the other end of the link 13. Such configuration allows to bias the outer circumference 122 of the cam 12 upward in the drawing by the link 13, the bias pin 14, and the tensile spring 15, when the objective 5a, 5b is positioned at the observation optical axis A.

As shown in the drawing, the outer circumference 122 of the cam 12 includes a middle section 122b formed in arc about the rotation center (rotation shaft 3) of the cam 12, and introduction sections 122a, 122c formed like a beveling at both sides thereof.

A shield member (thin plate member) 18 is provided on the back of the transmission gear 9. Sensors (photointerrupter) 17a, 17b detecting the shield member 18 moving according to the rotation of the transmission gear 9 are disposed on the surface of the mechanism section base 6. The sensors 17a, 17b are disposed at a position to detect the shield member 18 when the bias pin 14 reaches respectively the introduction section 122a or 122c of the outer circumference 122 of the cam 12.

Figure 3:
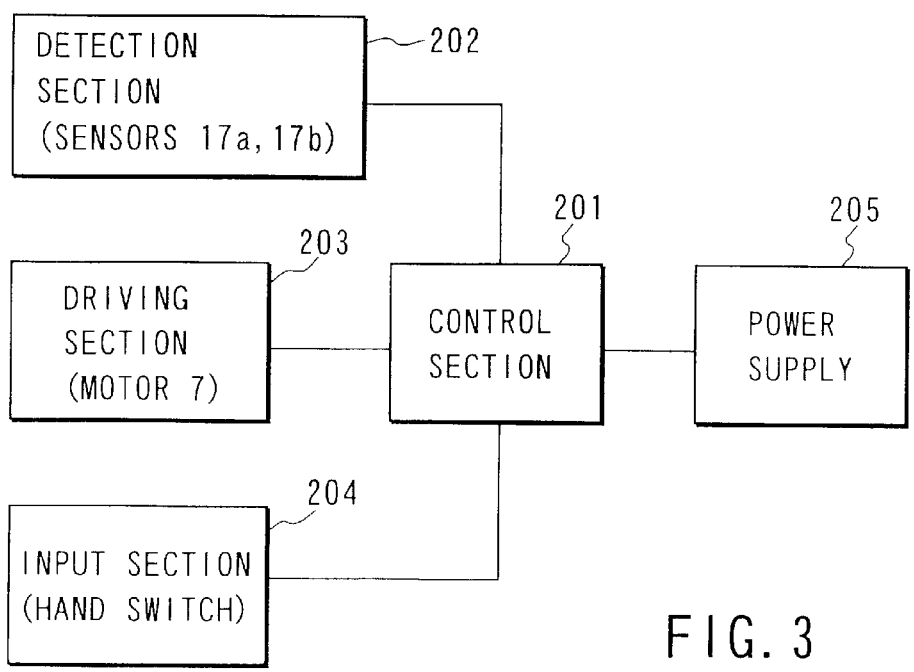
FIG. 3 is a control block diagram of the objective changing-over apparatus.

FIG. 3 is a control block diagram of the objective changing-over apparatus. As shown in FIG. 3, a detection section 202 comprising the sensors 17a, 17b, a driving section 203 comprising the DC geared motor 7, an input section 204 comprising a hand switch (toggle switch) and a power supply 205 are connected to the control section 201.

FIGS. 4 to 9 show the operation of the objective changing-over apparatus composed as described above and show a state viewed from the arrow B direction of FIG. 2. Now, the operation with time of this objective changing-over apparatus will be described in the order of FIGS. 4 to 9. In FIGS. 4 to 9, similar parts are designated by the same reference number.

Figure 4:
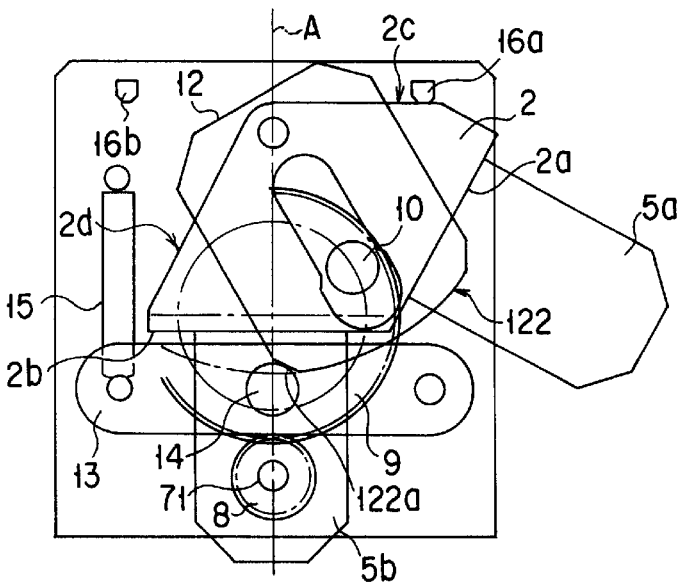

FIG. 4 shows the objective 5b positioned on the observation optical axis A. In this case, the objective 5b is positioned exactly on the observation optical axis A, because the bias pin 14 on the link 13 pressed the introduction section 122a of the outer circumference 122 of the cam 12, and a face 2c of the rotation member 2 is applied to a stopper 16a provided as abutting member on the attachment member 1 (or mechanism section base 6).

Figure 5:
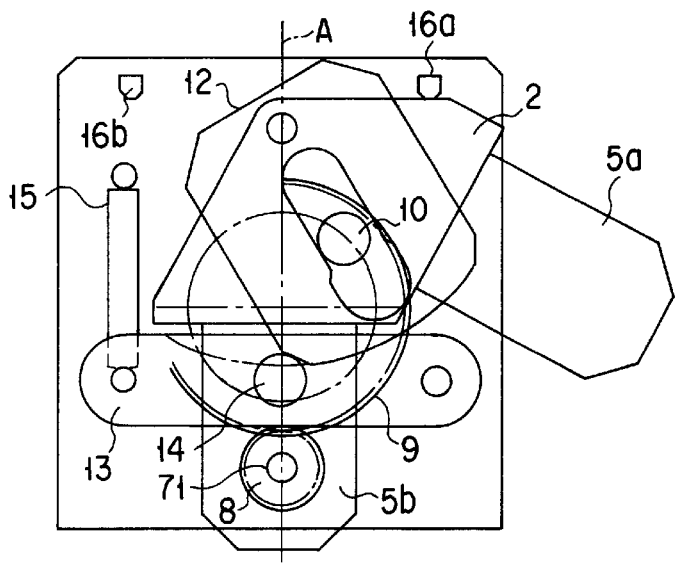

FIG. 5 shows the state where the cam 12 comes into contact with the driving pin 10 by the rotation of the DC geared motor 7, when the observer gives an instruction to change the objective from the input section 204 such as hand switch. The driving pin 10 moves slightly upper than the position of FIG. 4 as the rotation of the motor 7 is transmitted to the transmission gear 9 through the output shaft 71 and the motor gear 8 and the transmission gear 9 starts to rotate. From the start up to this state, the power is not transmitted to the cam 12 event when the driving pin 10 drives, and the rotation member 2 remains applied to the stopper 16a.

Figure 6:
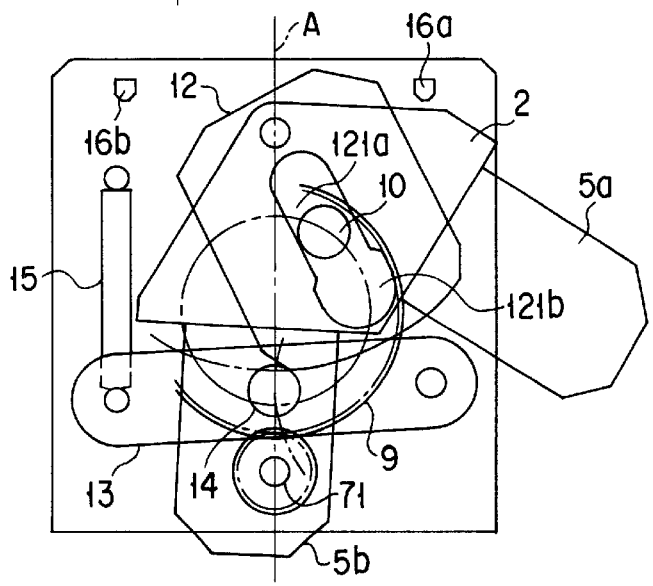

FIG. 6 shows the state where the rotation of the motor 7 is advanced. As the rotation of the motor 7 advances, the driving pin 10 on the transmission gear 9 begins to press the edge of the transmission section 121a of the cam 12, and the rotation member 2 is rotated.

FIG. 7 shows the state where the rotation of the motor 7 is further advanced. As the rotation of the motor 7 advances further, the bias pin 14 runs onto an arc section 122b of the outer circumference of the cam 12. Therefore, the force acting on the cam 12 by the bias pin 14 is directed to the center of the rotation member 2, and the rotation of the rotation member 2 would not be restricted by the bias pin 14.

FIG. 8 shows the state where the rotation of the motor 7 is still further advanced. As the rotation of the motor 7 advances still further, the bias pin 14 presses the introduction section 122c of the cam 12, and the rotation member 2 is rotated by the bias of the tensile spring 15, until the face 2d abuts against the stopper 16b provided on the attachment member 1 (or mechanism section base 6). At the position where the face 2d of the rotation member 2 is applied to the stopper 16b, as the center of the objective 5a and the observation optical axis A are adjusted to be positioned exactly, the objective 5a reaches the intended position. At this time, the shield member 18 is detected by the sensor 17a to stop the rotation of the motor 7.

FIG. 9 shows the state where the rotation of the motor 7 stop. In this state, even if the motor 7 rotates by inertia, the rotation of the motor 7 is not transmitted to the rotation member 2, because the driving pin 10 is positioned in the enlarged insensitive area 121b of the cam 12.

This allows the accuracy of the stop position of the motor 7 to be rough, and a small and high torque DC geared motor can be used. It also allows the position detection for controlling the stop position of the motor 7 to be rough, the sensor position adjustment also becomes unnecessary.

As the DC geared motor comprises a gear head having a high deceleration ratio and directly connected to the DC motor, high torque can be obtained by a small and economic configuration. Therefore, a stable changing-over (changeover) operation independent of objective mounting state can be realized by a simple and economic configuration through the use of a motor having enough driving torque for the maximum possible load.

Figure 10:
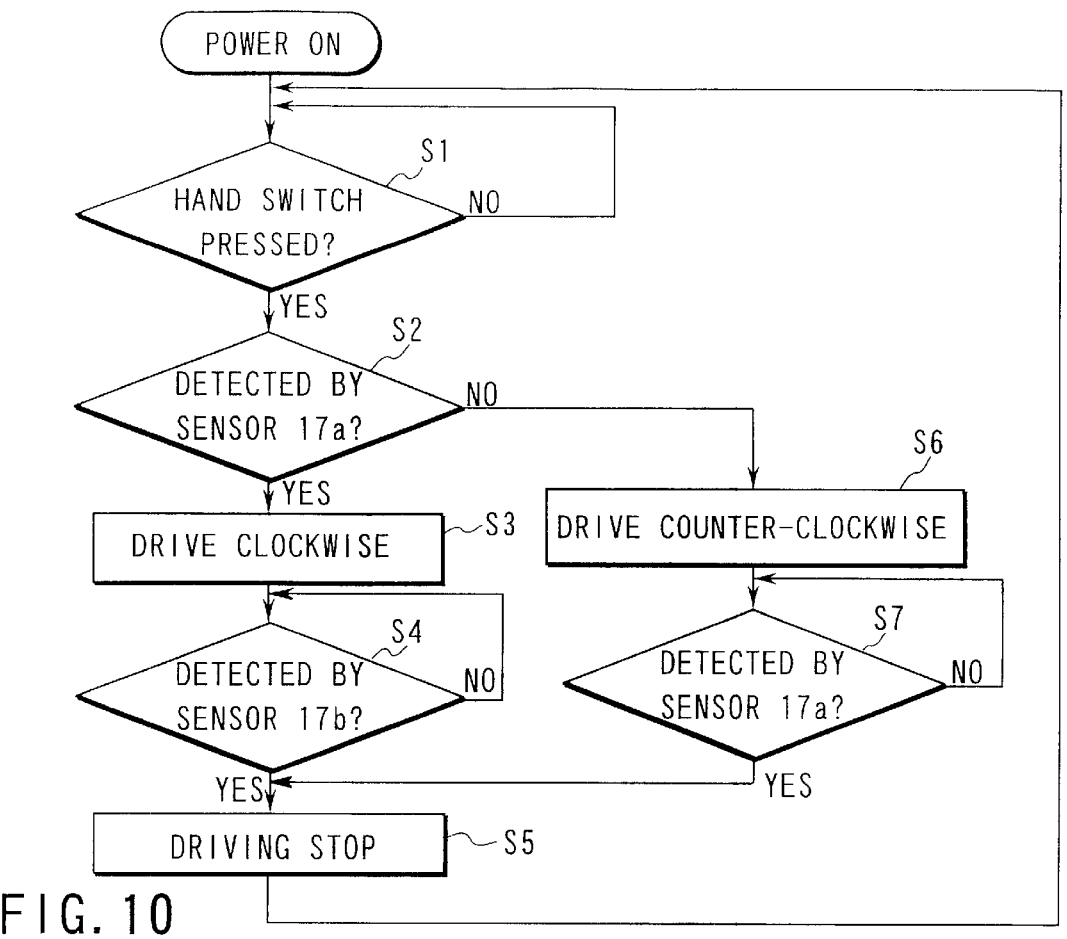
FIG. 10 is a flow chart showing the operation procedures of the objective changing-over apparatus.

FIG. 10 is a flow chart showing the operation procedures of the aforementioned objective changing-over apparatus. Now, the operation procedures of this objective changing-over apparatus will be described based on FIG. 10.

When the power 205 is put ON by the observer, and it is detected that the hand switch of the input section 204 is pressed in the step S1, and the sensor 17a of the detection section 202 detects the shield member 18 in the step S2, the control section 201 drives the DC geared motor 7 clockwise (clockwise in FIGS. 4 to 9 facing the drawing) in the step S3. Then, when the sensor 17b detects the shield member 18 in the step 4, the control section 201 stops driving the DC geared motor 7 in the step S5.

When the sensor 17a does not detect the shield member 18 in the step S2 (the sensor 17b detects the shield member 18), the control section 201 drives the DC geared motor 7 counter-clockwise (counter-clockwise in FIGS. 4 to 9 facing the drawing) in the step S6. Then, when the sensor 17a detects the shield member 18 in the step S7, the control section 201 stops driving the DC geared motor 7 in the step S5.

Thus, according to this first embodiment, the abutting member (stopper 16a, 16b) provided on the attachment member 1 (or mechanism section base 6) can be adopted as positioning mechanism, by employing two objective mountable on the rotation member 2, and the introduction range of objective positioning can be enlarged by setting a clearance for driving force transmission mechanism. Moreover, the endurance can be improved and the motor operation control becomes simpler compared to the conventional click type positioning using a leaf spring.

Figure 11:
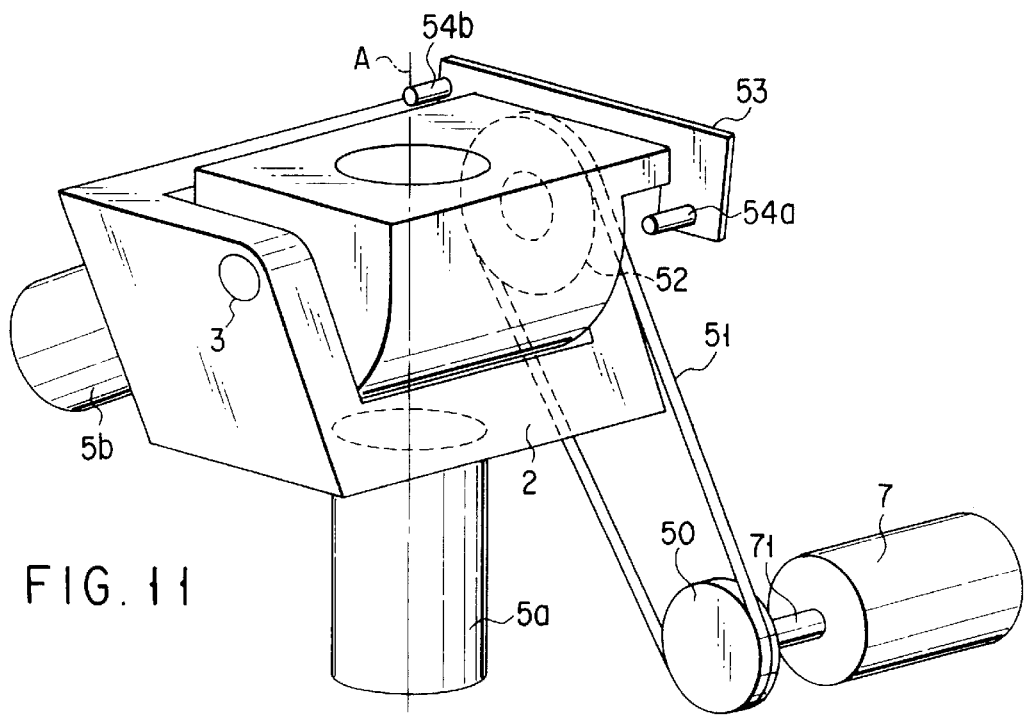
FIG. 11 is a perspective view showing the configuration of a microscope to which an objective changing-over apparatus according to the embodiment of the present invention is applied.

FIG. 11 is a perspective view showing the configuration of a microscope to which an objective changing-over apparatus according to a second embodiment of the present invention is applied. In the objective changing-over apparatus shown in FIG. 11, similar parts are designated by the same reference number. The control block diagram of this objective changing-over apparatus is similar to FIG. 3 from which the detection section is eliminated.

Figure 12:
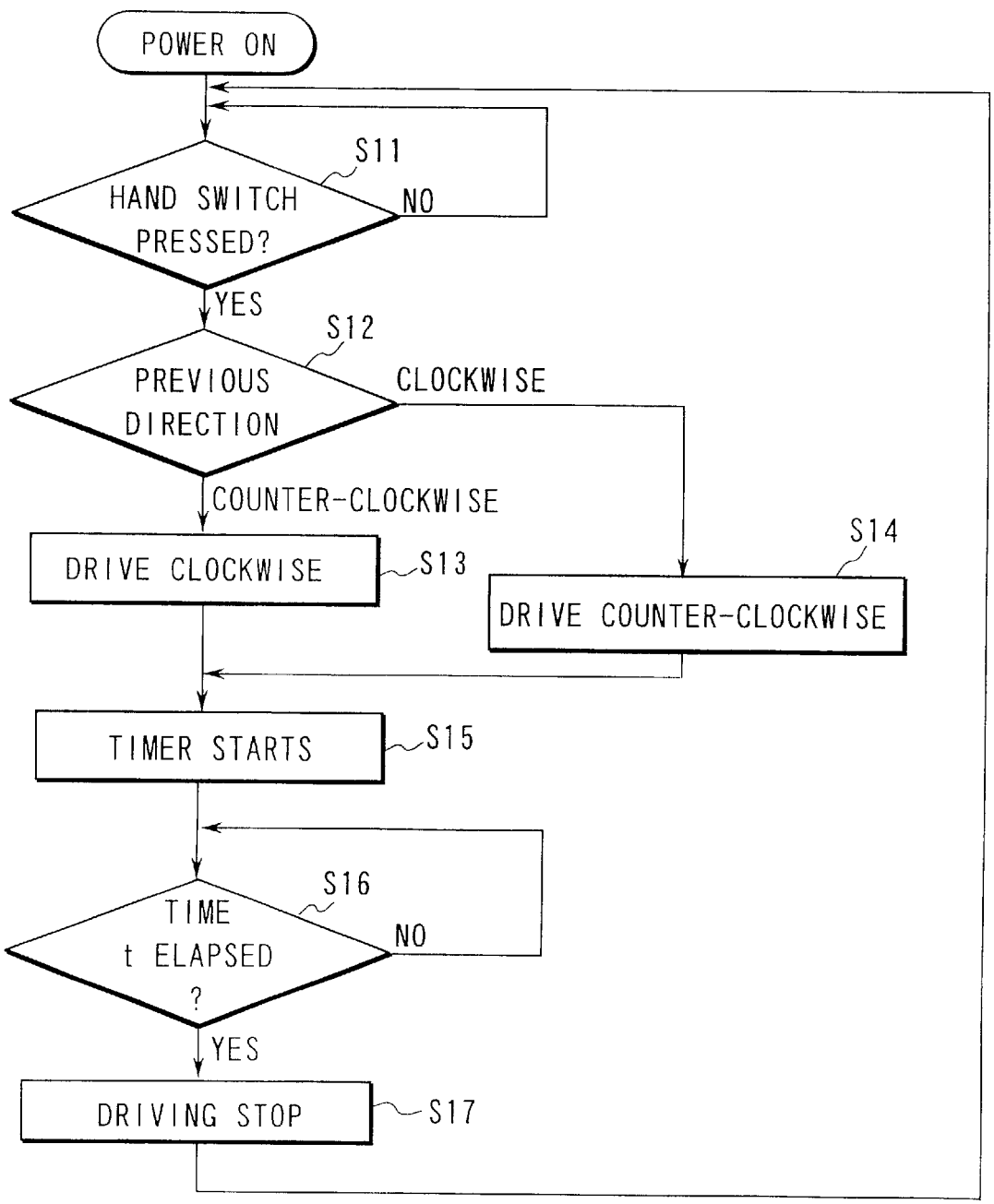
FIG. 12 is a flow chart showing the operation procedures of the objective changing-over apparatus.

The operation procedure of this objective changing-over apparatus will be described based on the flow chart of FIG. 12.

When the power 205 is put ON by the observer, the hand switch of the input section 204 is pressed in the step S11, and if the stored previous DC geared motor rotation direction is counter-clockwise in the step S12, the control section 201 drives the DC geared motor 7 clockwise in the step S13.

The control section 201 drives the DC geared motor 7 counter-clockwise in the step S14, if the stored previous DC geared motor rotation direction is clockwise in the step 12.

Then, the control section 201 starts to count the elapsed time with a built-in timer in the step S15, stops driving the DC geared motor 7 in the step S17, if a predetermined time t has elapsed.

Figure 13:
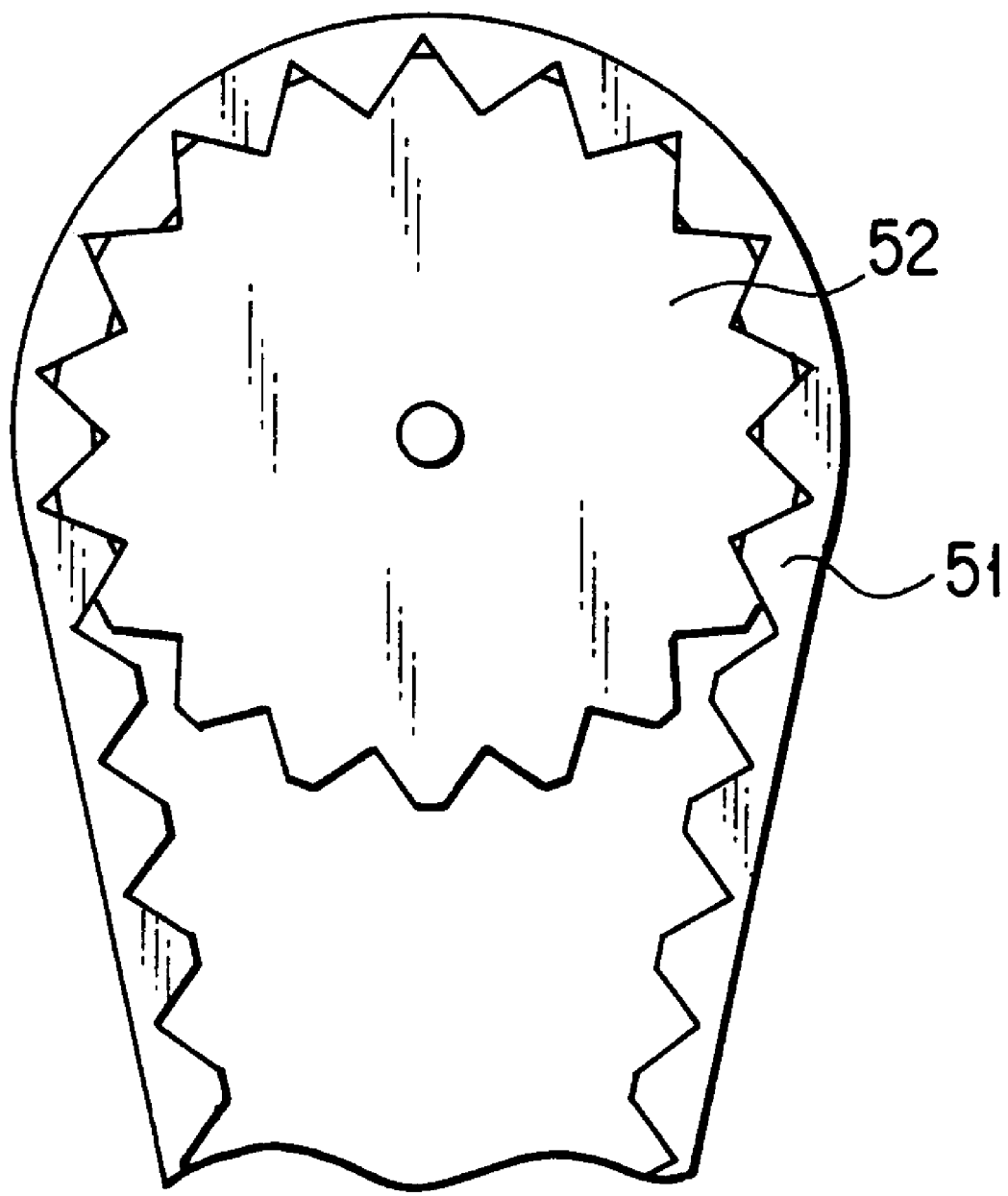
FIG. 13 shows a rotation gear and a belt of the objective changing-over apparatus.

Now, the mechanical motion will be further described. The rotation of the motor 7 rotates a driving gear 50 (having the same shape as the rotation gear 52 shown in FIG. 13 and a smaller diameter than the rotation gear 52) mounted to the output shaft 71, and the rotation force of the driving gear 50 is transmitted to the rotation gear 52 fixed to the rotation member 2 through an elastic belt 51 (see FIG. 13) provided with teeth. When the rotation member 2 rotates by a predetermined number, the rotation member 2 abuts pins 54a, 54b provided on a plate 53 fixed to the mounting member 1 and stops to rotate. As the changeover time is set longer than the time required for the changeover operation, the elastic belt 51 is elongated conveniently after the restriction of the rotation of the motor 2. As a motor having a high deceleration ratio is used, the belt tension is maintained after the motor has stopped, without being turned by the belt tension. On the other hand, the belt tension generated here, acts as a force to resist the rotation by the retracted objective, and to apply always the rotation member 2 to the pins 54a, 54b of the abutting member in the stop state.

Thus, this second embodiment allows to adopt abutting (pins 54a, 54b) as positioning mechanism, by making two objectives mountable on the rotation member 2, and improve the durability than the conventional product using a click. Moreover, the changeover provokes less impact, because the force for keeping the position exerts gradually during the changeover operation, allowing also to improve the product durability. Moreover, the less impact is translated into less vibration, allowing to reduce image fluctuation during the changeover, reducing the fatigue of an operator observing for a long time. In addition, an inexpensive apparatus can be provided, because the objective changeover can be realized with a configuration simpler than the first embodiment.

Thus, according to this second embodiment, the abutting member (pins 54a, 54b) can be adopted as positioning mechanism, by employing two objectives mountable on the rotation member 2. Besides, objective changing-over (changeover) can be performed by a configuration simpler than the aforementioned first embodiment.

Though the rotation shaft 3 of the rotation member 2 has been disposed normal to the observation optical axis A in the first and the second embodiments, as in the conventional objective changing-over apparatus, the same functional effect can be obtained by slanting the shaft by 15 degrees with respect to the observation optical axis A.

Figure 14:
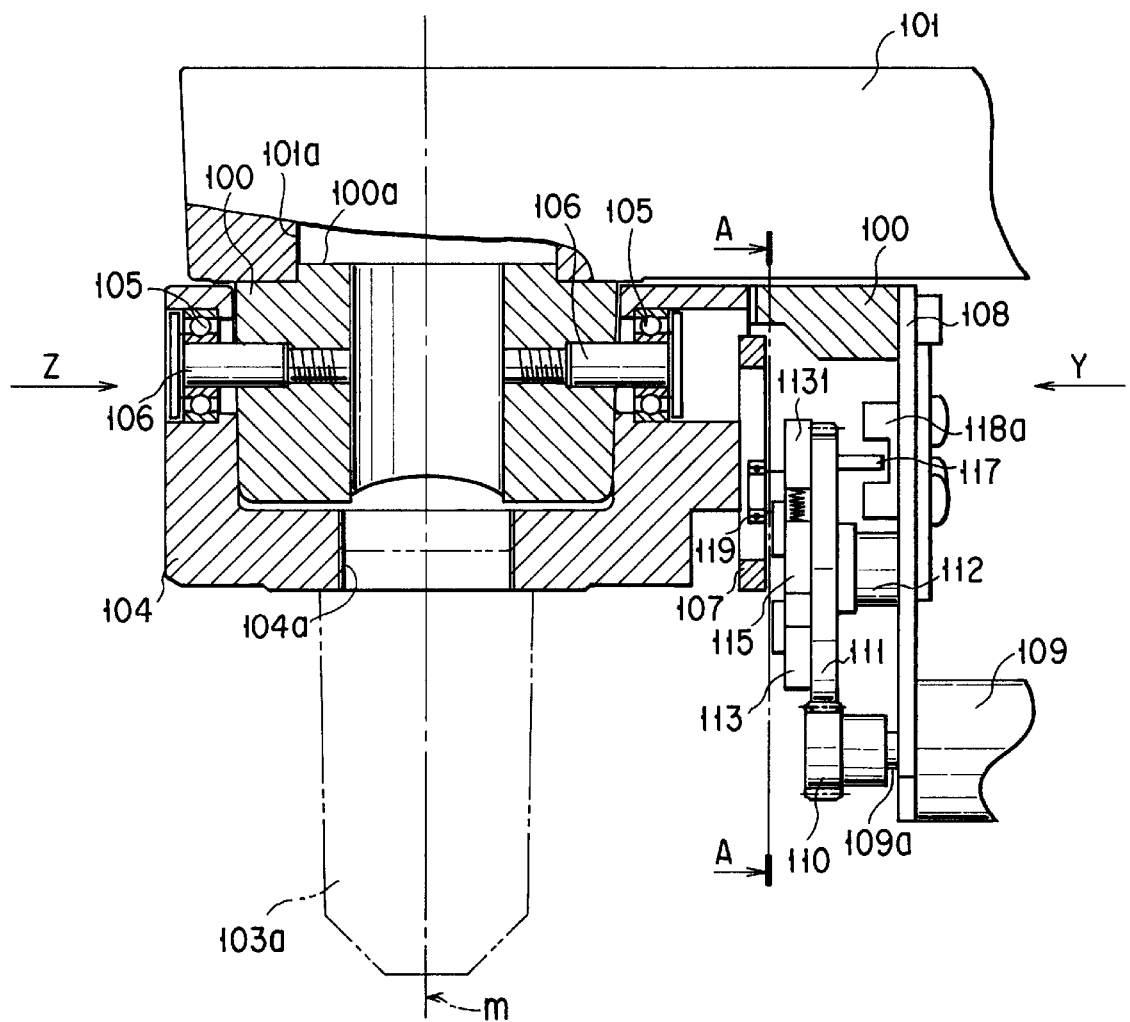
FIG. 14 is a partial side cross-section view showing the configuration of an objective changing-over apparatus according to the embodiment of the present invention.
Figure 15:
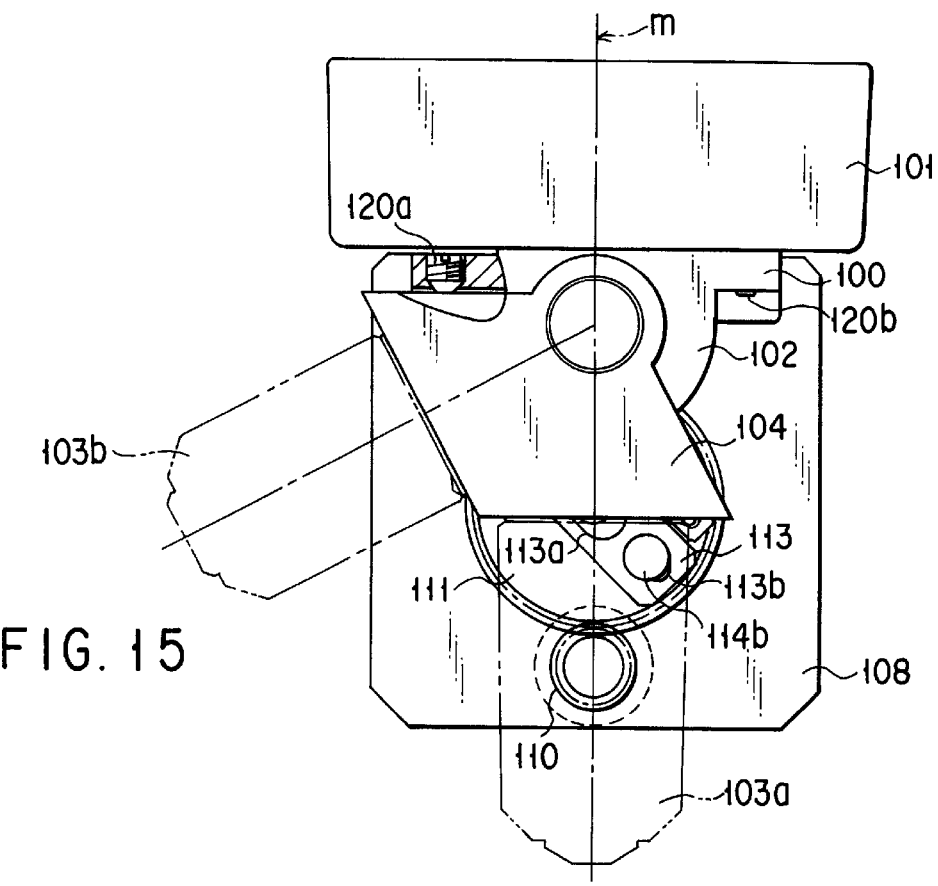
FIG. 15 is a view along Z of FIG. 14.
Figure 16:
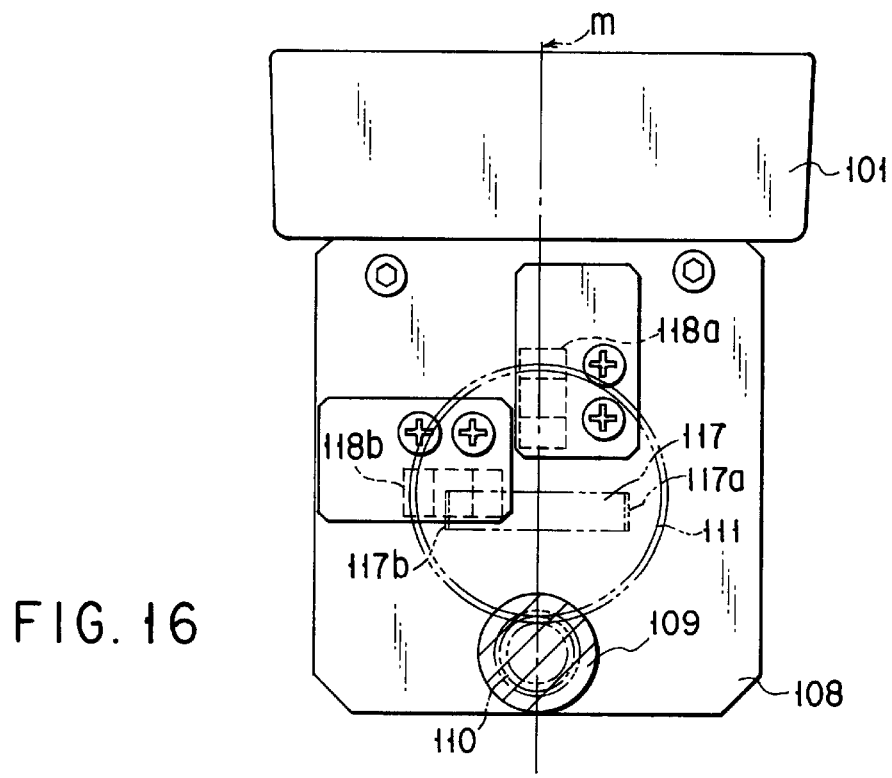
FIG. 16 is a view along Y of FIG. 14.
Figure 17:
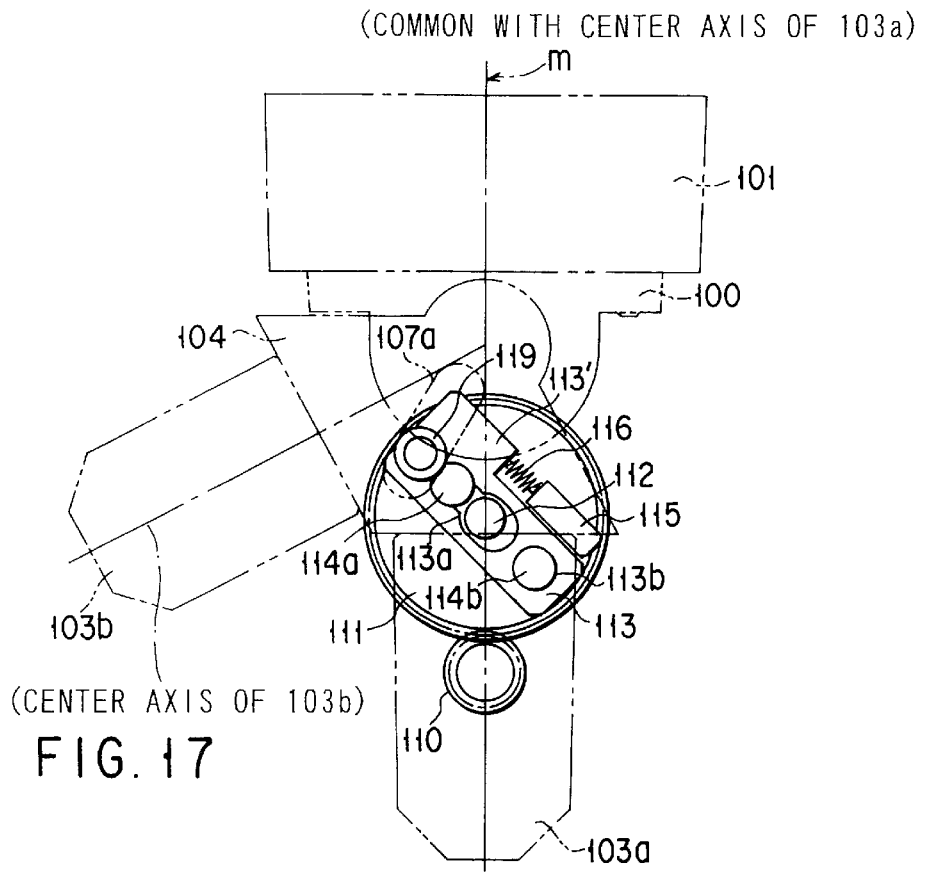
FIG. 17 is a cross-section view along A—A of FIG. 14.

FIG. 14 is a partial side cross-section view showing the configuration of an objective changing-over apparatus according to a third embodiment of the present invention. This objective changing-over apparatus is attached to the microscope shown in FIG. 1. FIG. 15 is a view along Z of FIG. 14, FIG. 16 is a view along Y of FIG. 14, and FIG. 17 is a cross-section view along A—A of FIG. 14.

Now, the configuration of this objective changing-over apparatus will be described based on FIGS. 14 to 17. As shown in FIG. 14, a cylindrical recession 101a is provided on a microscope body 101, and a cylindrical protrusion 100a is provided on an attachment member 100. There, the microscope body 101 is fixed to the attachment member 100, by fitting the recession 101a with the protrusion 100a and using a fixing screw (not shown).

Two objective attachment sections 104a, 104b (104b is not shown) made of screw hole are provided on the rotation member 104. Objectives 103a, 103b are mounted respectively on these attachment sections 104a, 104b making an angle of about 60 degrees. In addition, abutting members 120a, 120b are disposed on the attachment member 100 to limit the rotation of the rotation member 104.

Both sides of the rotation member 104 are rotatably supported by the rotation shafts 106, 106 via bearings 105, 105 respectively, so that the rotation member 104 is rotatably supported to the attachment member 100. The length of projection of the abutting member 120a, 120b is so adjusted that the rotation of the rotation member 104 is limited at the position of agreement of the center of the objective attachment section 104a, 104b with the optical axis m of the microscope.

Further, a cam member 107 is integrally mounted to the rotation member 104. A straight hole shape opening 107a constituting the transmission section of a pin member (bearing) 119 mentioned below, is provided on the cam member 107. This opening 107a is disposed in the radial direction from the center of the rotation member 104, and the angle made by the line and the center axis of the objective 103a and the angle made by the line and the center axis of the objective 103a are equal.

An objective changing-over apparatus base 108 is attached to an end face of the attachment member 100. A DC motor 109 for the driving source, is fixed on the base 108. A pinion gear 110 is attached to an output shaft end 109a of the DC motor 109. Also, a rotation shaft 112 is provided on the base 108, and a power side rotation member 111 is rotatably attached to this rotation shaft 112. The outer circumference of the power side rotation member 111 is provided with a gear section meshing with the pinion gear 110.

A slide member 113 is attached to the rotation member 104 side of the power side rotation member 111 by means of two fixing shafts 114a, 114b. The slide member 113 is provided with long holes 113a, 113b, and the long hole 113a has two-step diameter holes. The fixing shaft 114a is inserted in the smaller diameter hole of the long hole 113a, and the fixing shaft 112 into the larger diameter hole, and the diameter of the top of the fixing shaft 114a is larger than the smaller diameter hole of the long hole 113a. Besides, the fixing shaft 114b is inserted into the long hole 113b, and the diameter of the top of the fixing shaft 114b is larger than the diameter of the long hole 113a. This makes the slide member 113 movable with respect to the fixing shafts 114a, 114b and the fixing shaft 112, and its stroke is limited by the long holes 113a, 113b.

Moreover, the slide member 113 is provided with a pin member 119 composed of a bearing of the size for fitting in an opening 107a of a cam member 107. This allows the pin member 119 to move along the opening 107a of the cam member 107. Note that the whole cam member 107 is not shown in FIG. 17 for convenience, but only the opening 107a is illustrated.

A spring fixing member 115 is attached to the rotation member 104 side of the power side rotation member 111. The spring fixing member 115 is mounted to a protrusion 1131 of the slide member 113 via a compression spring 116. Besides, as the free length of the compression spring 116 is longer than the stroke (in the direction separating from the spring fixing member 115) length X of the slide member 113 limited by the long hole 113a, the slide member 113 is always pressed by the compression spring 116.

On the other hand, a shield plate 117 having two bent sections (thin plate members) 117a, 117b is attached to the side opposed to the rotation member 104 side of the power side rotation member 111. Moreover, a rotation angle sensors (photointerrupters) 118a, 118b for detecting the bent sections 117a, 117b of the shield plate 117 moving according to the rotation of the power side rotation member 111 are provided on the rotation member 104 side of the base 108.

FIGS. 18 to 22 illustrate successively the operation of the objective changing-over apparatus composed as mentioned above, and show the cross-section along A—A of FIG. 14. FIGS. 18 to 22 show the essential parts for the operation, and the objectives 103a, 103b, the rotation member 104, the attachment member 100, the microscope body 101, and the opening 107a of the cam member 107 are shown by alternate long and two short dashes line. Now the operation to change the objective 103a on the optical axis m of the microscope to the objective 103b will be described.

Figure 18:
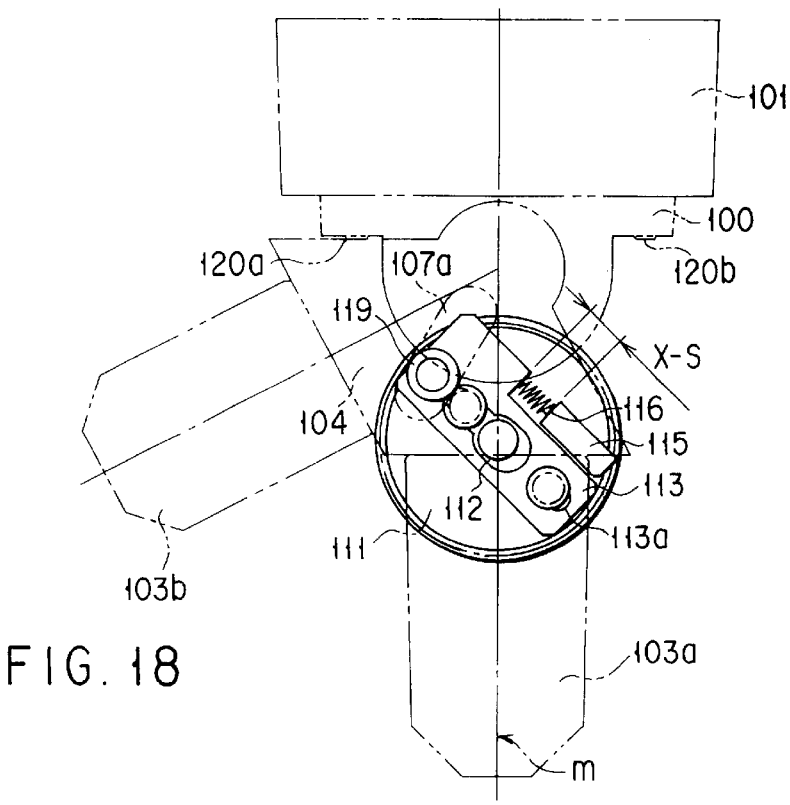
FIGS. 18, 19, 20, 21 and 22 illustrate successively the operation of the objective changing-over apparatus.

FIG. 18 shows the state where the objective 103a is positioned on the optical axis m of the microscope. In this state, the rotation member 104 is applied to the abutting member 120a. The slide member 113 has rotated to the position where the bent section 117b of the shield plate 117 is detected by the rotation angle sensor 118b.

Besides, the position of the pin member 119 is determined by the position of the cam member 107 (opening 107a) and the slide member 113, and in this state, the compression spring 116 is compressed to the length X-S. The objective 103a can be held on the optical axis m of the microscope as the compression force of this compression spring 116 resists against the rotation force generated by gravity force of the objective 103b or the rotation member 104.

Figure 19:
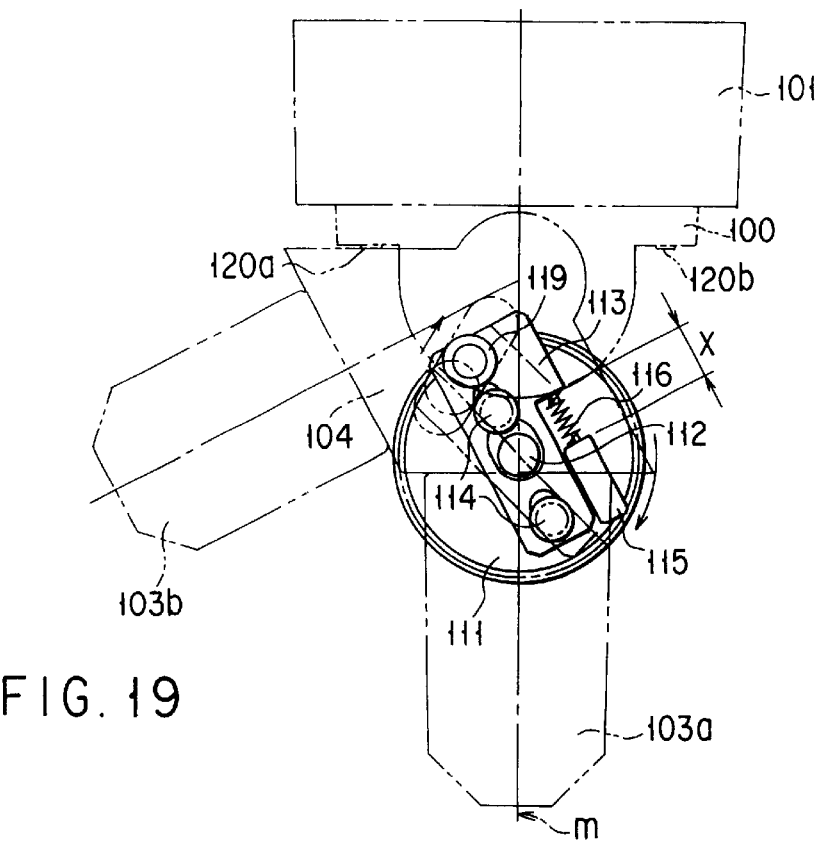
Figure 20:
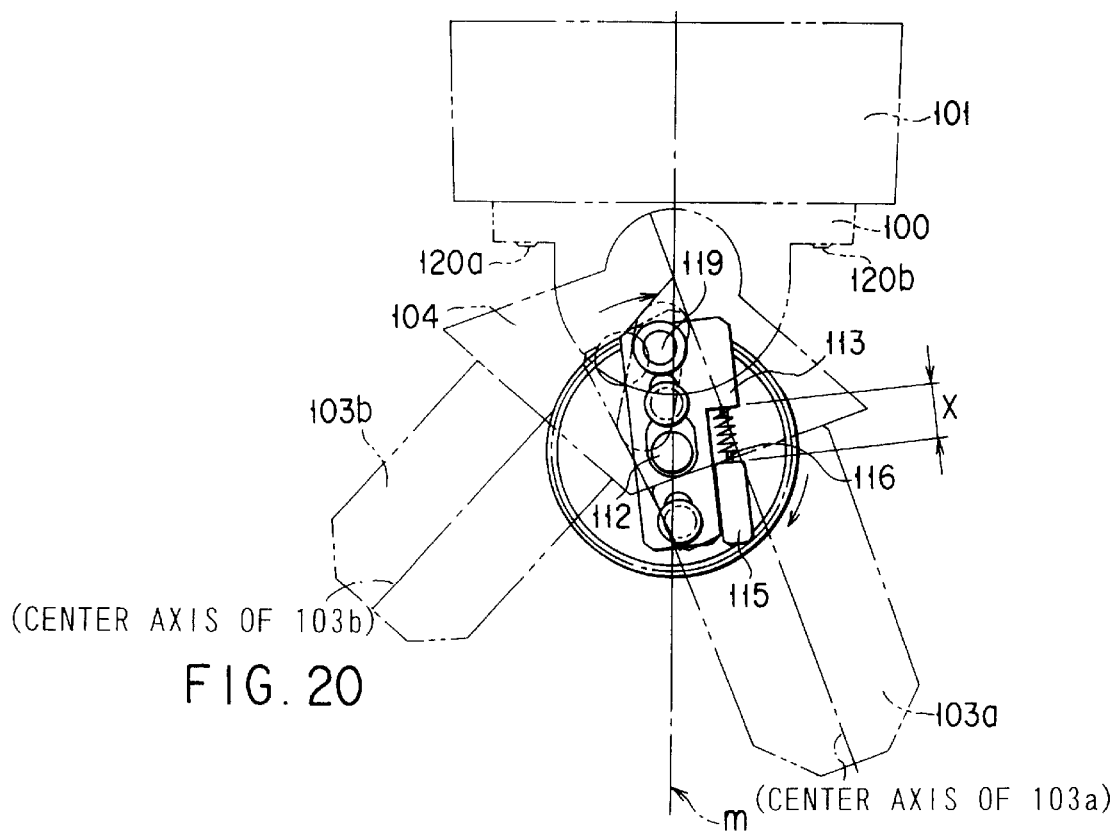

FIG. 19 shows the state where the slide member 113 attains the stroke end and the pin member 119 is positioned outermost, by rotating the power side rotation member 111 clockwise facing the drawing by the DC motor 109. Until this state, the rotation force of the power side rotation member 111 is hardly transmitted to the rotation member 104. In other words, the rotation member 104 rotates hardly until this state.

After this state, namely after FIG. 19 (FIGS. 19 to 21), the cam member 107 (opening 107a) is positioned at the position of pin member 119 engagement, if the pin member 119 rotates according to the rotation of the power side rotation member 111. Therefore, if the pin member 119 rotates, the objectives 103a, 103b rotate with the cam member 107 and the rotation member 104. The pin member 119 and the opening 107a of the cam member 107 remain in contact in fitted state, and the objective can be changed over smoothly, as there is no backlash of transmission passage.

Figure 21:
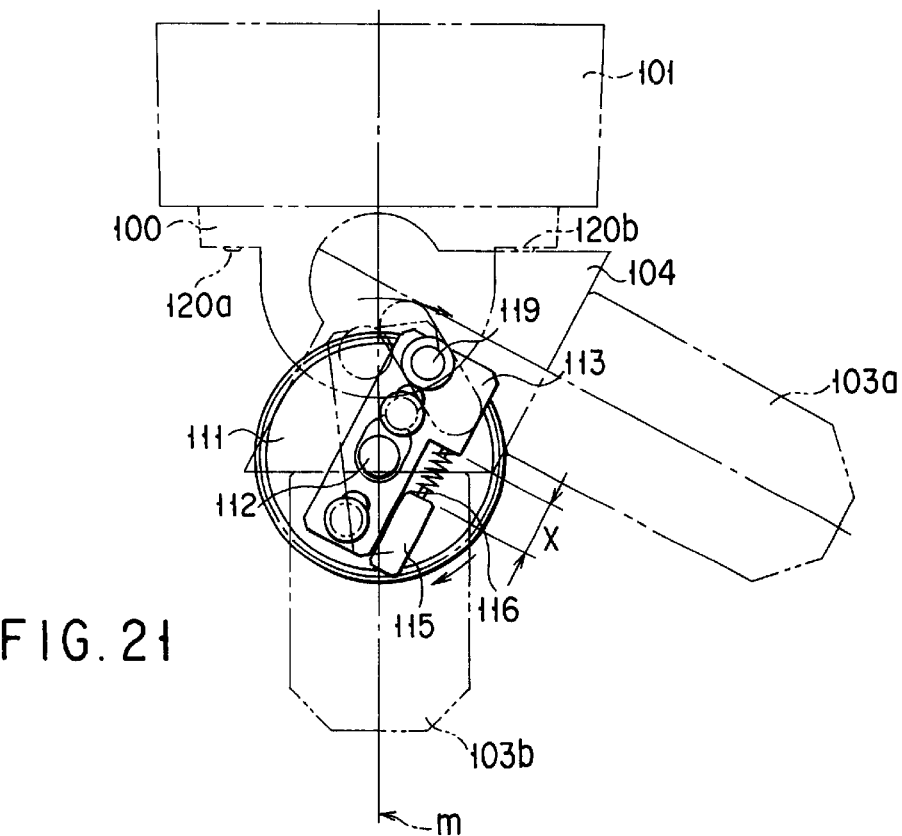

FIG. 21 shows the state where the rotation member 104 abuts the abutting member 120b and the rotation of the rotation member 104 stops. As the length of the compression spring 116 became X, a compression force is not acting against the motion power force of the objective 103a or the like. Therefore, the impact is small, because only the inertia of the rotation member 104 and the objective acts, during the collision of the rotation member 104 and the abutting member 120b. However, as the bent section 117a of the shield plate 117 has not attained at the rotation angle sensor 118a, the DC motor 109 does not stop rotating.

Figure 22:
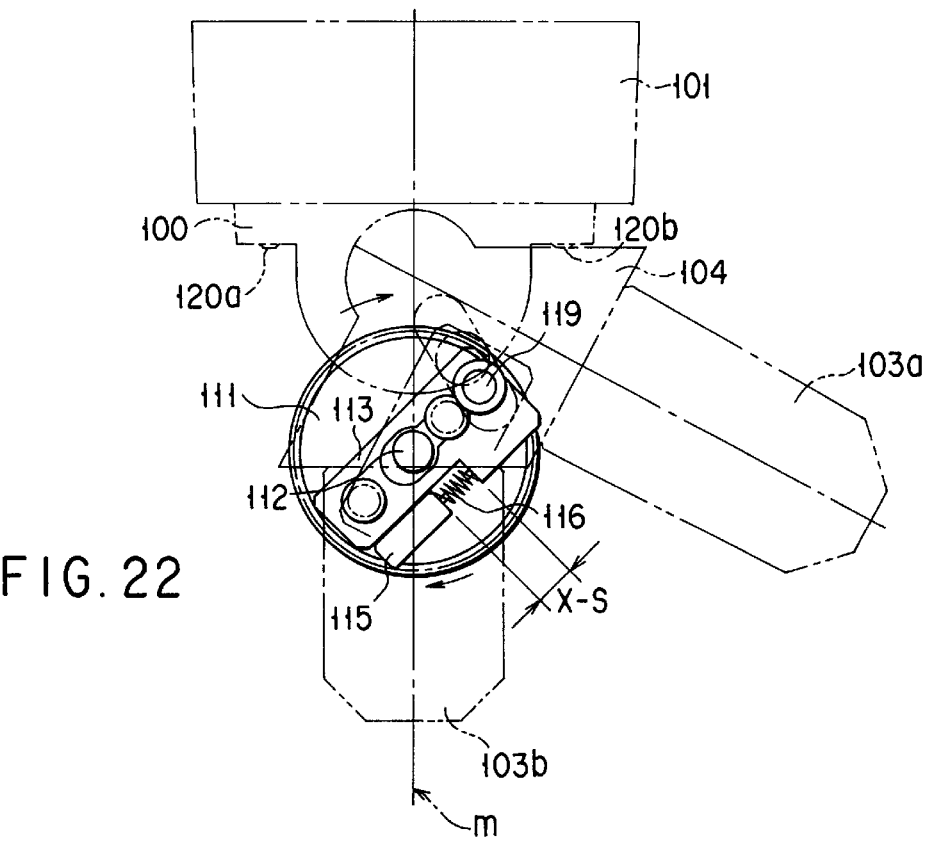

When the DC motor 109 continues to rotate and the bent section 117a of the shield plate 117 is detected by the rotation angle sensor 118a, the DC motor 109 stops rotating as shown in FIG. 22. In this state, the length of the compression spring 116 has attained to X-S. As the DC motor 109 uses a motor having a relatively high deceleration ratio, the compression force of the compression spring 116 presses the pin member 119 outside via the slide member 113 without rotating the DC motor 119. Therefore, in the state of FIG. 22, the rotation member 104 can be kept applied to the abutting member 120b against the gravity force of the objective 103a or the like, namely, the objective 103b can be held at the state positioned on the optical axis m of the microscope.

Thus, in this objective changing-over apparatus, the abutting impact is little, as the force to keep the objective with respect to the optical axis m of the microscope acts after the rotation member has been applied to the abutting member. Therefore, noise and vibration during the objective changing-over (changeover) operation can be prevented, and moreover, the product endurance can be improved.

Figure 23:
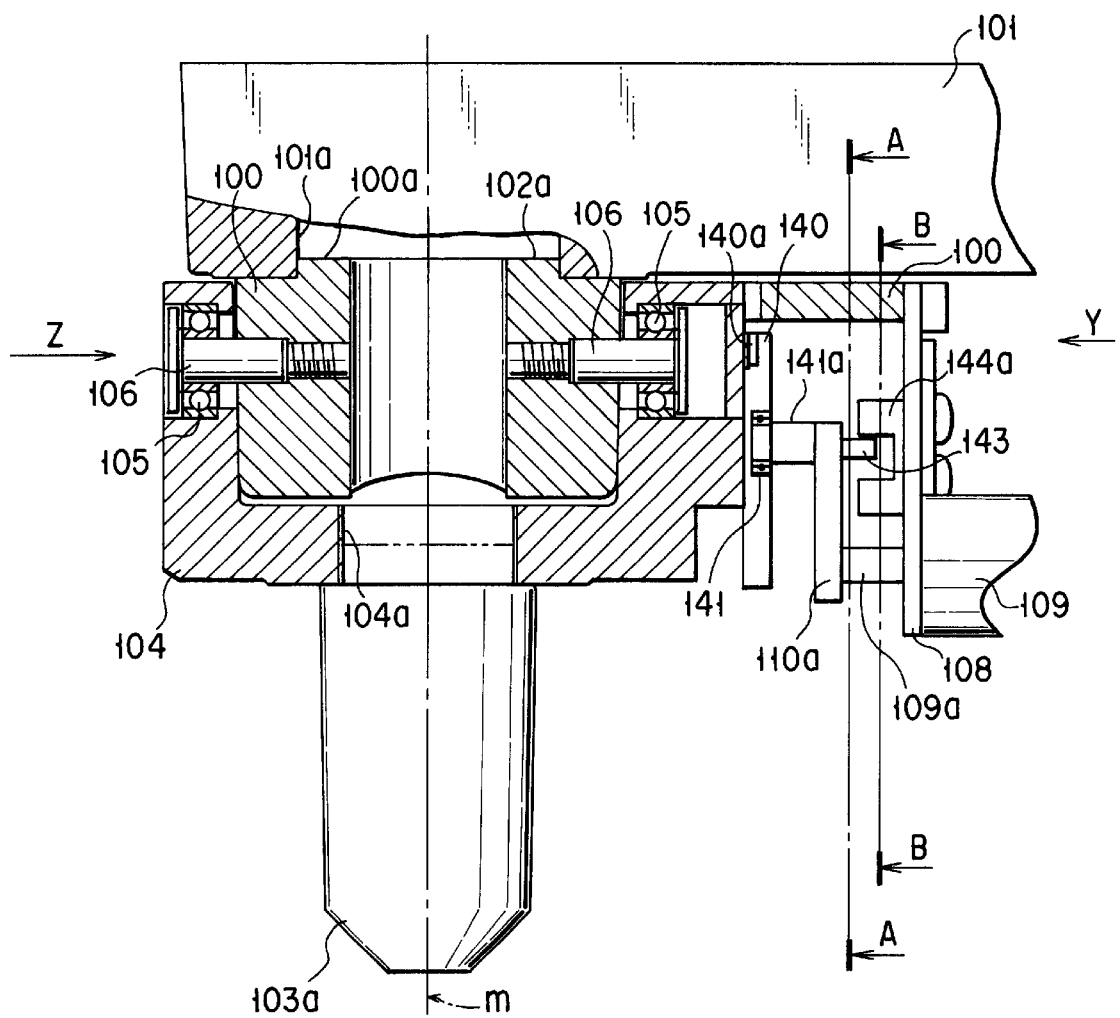
FIG. 23 is a partial side cross-section view showing the configuration of an objective changing-over apparatus according to the embodiment of the present invention.
Figure 24:
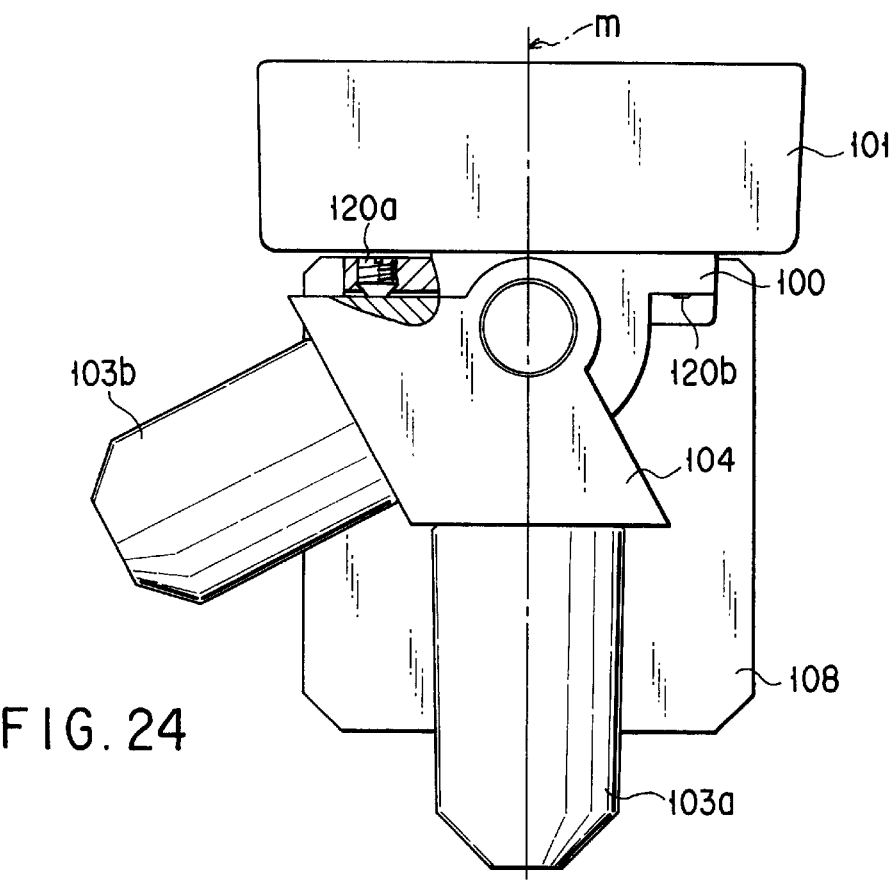
FIG. 24 is a view along Z of FIG. 23.
Figure 25:
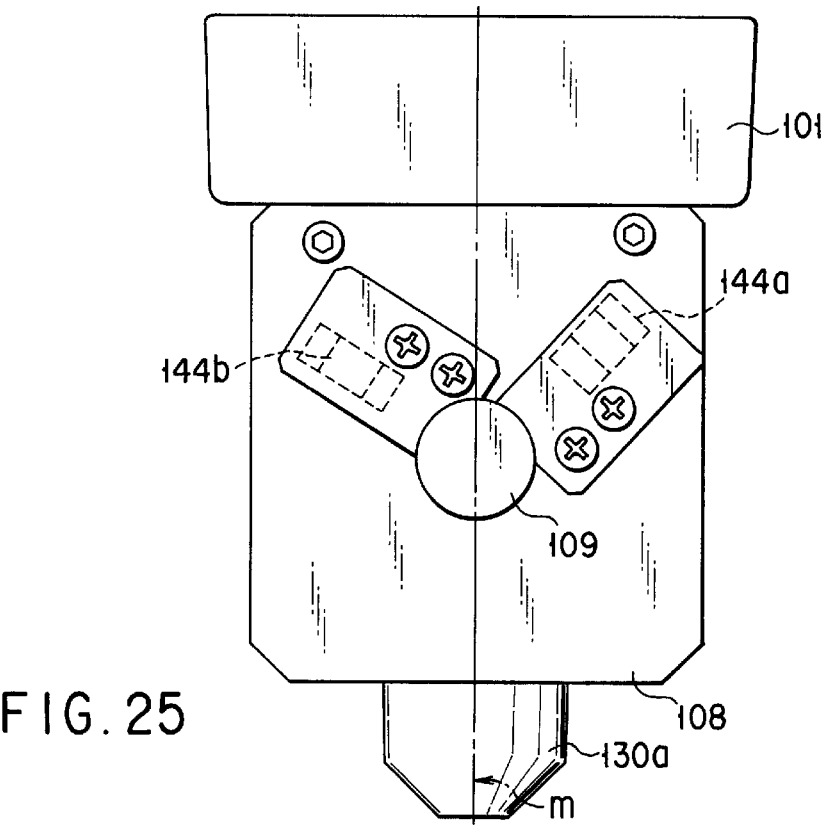
FIG. 25 is a view along Y of FIG. 23.

FIG. 23 is a partial side cross-section view showing the configuration of an objective changing-over apparatus according to a fourth embodiment of the present invention. This objective changing-over apparatus is attached to the microscope shown in FIG. 1. FIG. 24 is a view along Z of FIG. 23, FIG. 25 is a view along Y of FIG. 23.

Now, the configuration of this objective changing-over apparatus will be described based on FIGS. 23 to 25. As shown in FIG. 23, a cylindrical recession 101a is provided on a microscope body 101, and a cylindrical protrusion 100a is provided on an attachment member 100. Then, the attachment member 100 is fixed to the microscope body 101, by fitting the recession 101a with the protrusion 100a and using a fixing screw (not shown).

Two objective attachment sections 104a, 104b (104b is not shown) made of screw hole are provided on the rotation member 104. Objectives 103a, 103b are mounted respectively on these attachment sections 104a, 104b making an angle of about 60 degrees. In addition, abutting members 120a, 120b are disposed on the attachment member 100 to limit the rotation of the rotation member 104.

Both sides of the rotation member 104 are rotatably supported by the rotation shafts 106, 106 via bearings 105, 105 respectively, so that the rotation member 104 is rotatably supported to the attachment member 100. The length of projection of the abutting members 120a, 120b is so adjusted that the rotation of the rotation member 104 is limited at the position of agreement of the center of the objective attachment section 104a, 104b with the optical axis m of the microscope.

Further, a connection section 140a connecting one ends of two opposed leaf springs 140, 140 is mounted on the rotation center of the rotation member 104. These two opposed leaf springs 140, 140 are mounted in the direction of a line dividing the angle made by respective center line of the objective attachment section 104a, 104b into two, namely, in the direction orthogonal to the rotation direction of the rotation member 104.

An objective changeover mechanism base 108 is attached to the end face of the attachment member 100. A DC motor 109 or a driving source is fixed to the base 108. An output arm 110a is attached to the output shaft end 109a of the DC motor 109. A bearing 141 is attached to the rotation member 104 side of the output arm 110a, at the position capable of pressing the leaf springs 140, 140, via a shaft 141a.

On the other hand, a shield plate (thin plate member) 143 is attached to the side opposed to the rotation member 104 side of the output arm 110a. Moreover, rotation angle sensors (photointerrupters) 144a, 144b for detecting the shield plate 143 moving according to the rotation of the output arm 110a are provided on the rotation member 104 side of the base 108. These rotation angle sensors 144a, 144b make an angle of about 90 degrees each other, larger than the rotation angle of 60 degrees of the rotation member 104, and are positioned to detect the shield plate 143.

FIGS. 26 to 31 illustrate successively the operation of the objective changing-over apparatus composed as mentioned above, and FIG. 26 shows the cross-section along B—B of FIG. 23, and FIGS. 27 to 31 show the cross-section along A—A. FIGS. 26 to 31 show the essential parts for the operation. Now the operation to change the objective 103a on the optical axis m of the microscope to the objective 103b will be described.

Figure 26:
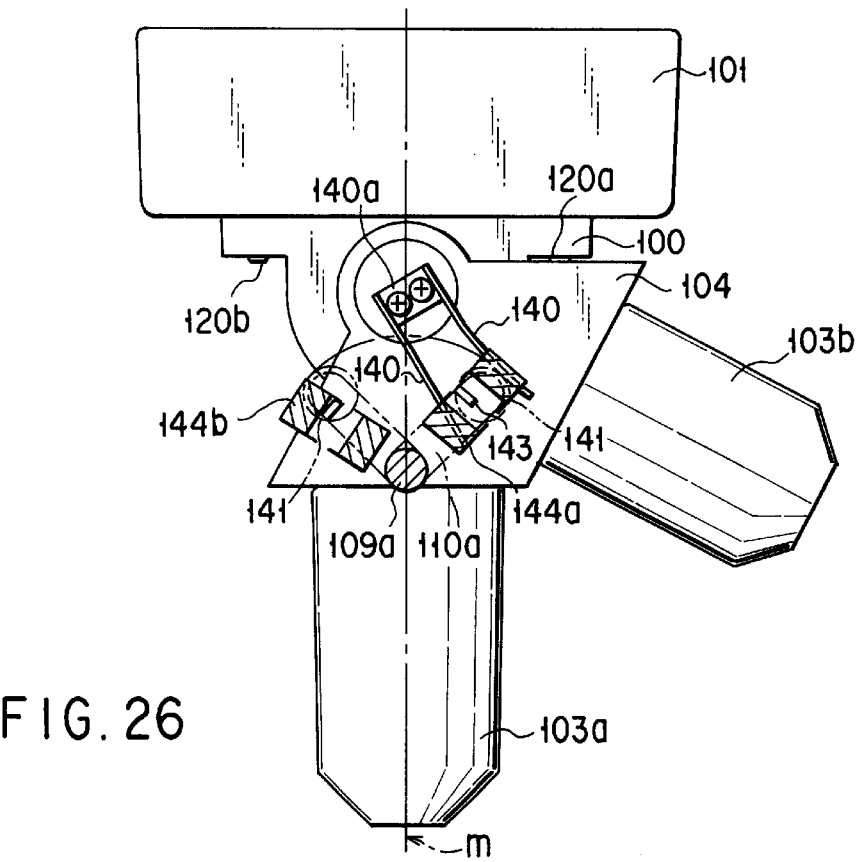
FIGS. 26, 27, 28, 29, and 31 illustrate successively the operation of the objective changing-over apparatus.
Figure 27:
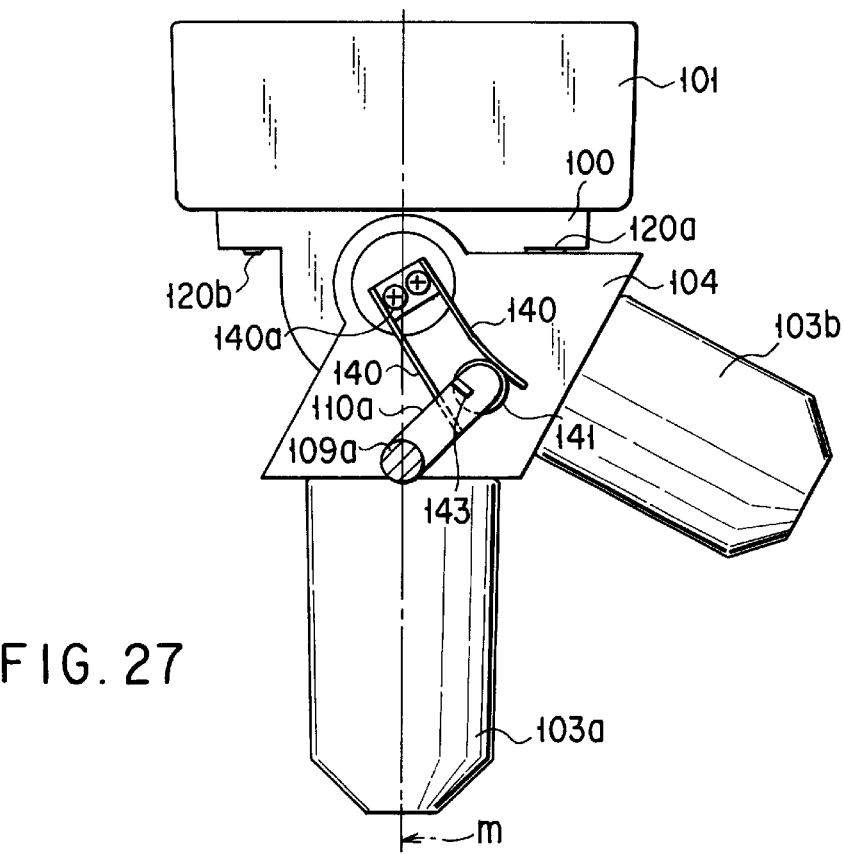

FIGS. 26 and 27 show the state where the objective 103a is positioned on the optical axis m of the microscope. In this state, the rotation member 104 is applied to the abutting member 120a. The output arm 110a has rotated to the position where the shield plate 143 is detected by the rotation angle sensor 144a.

The bearing 141 on the output arm 110a bends one leaf spring 140 in the range of its elasticity. Here, the rotation force acting on the rotation member 104 by the leaf spring 140 is set enough larger than the rotation force generated by the gravity when the objective 103b or the rotation member 104 rotates. As the DC motor 109 uses a motor having a relatively high deceleration ratio, it would not be turned by the leaf spring force. As the result, the objective 103a can be held on the optical axis m of the microscope.

Figure 34:
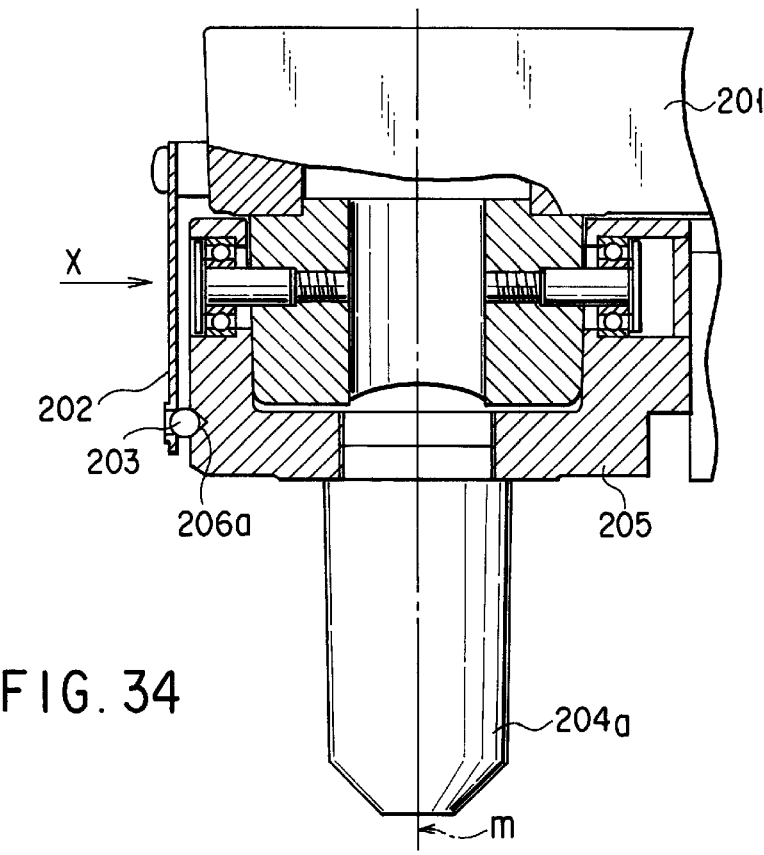
FIG. 34 shows the configuration of a click mechanism which is an example of engagement mechanism applied to the conventional objective changing-over apparatus.
Figure 35:
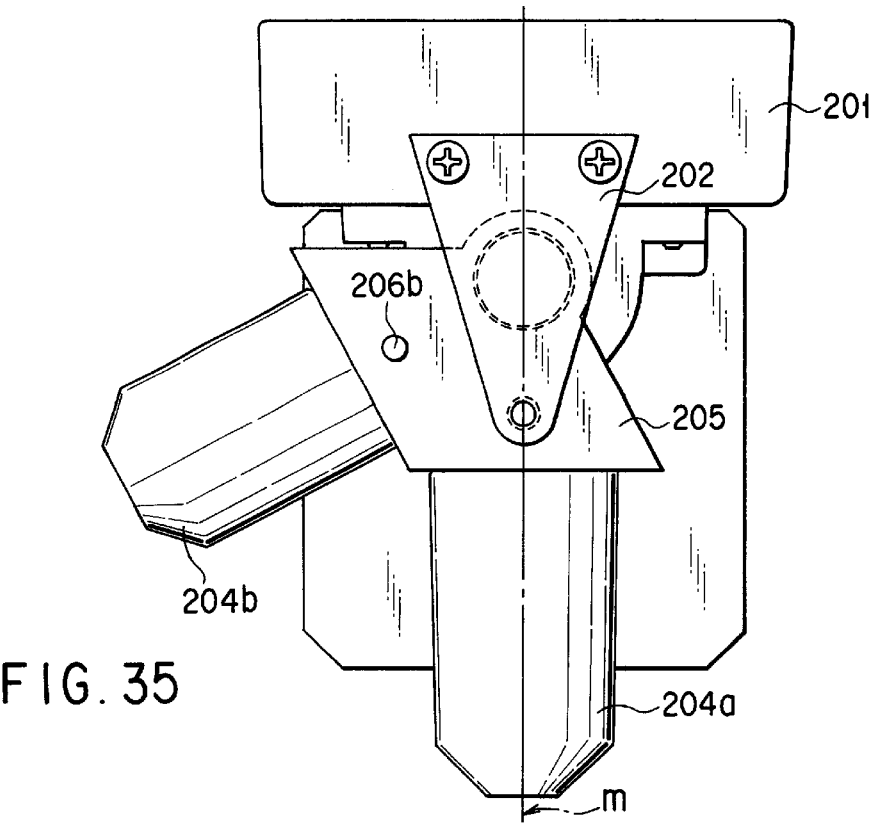
FIG. 35 is a view along X of FIG. 34.

Moreover, as the position of the rotation member 104 is reproduced by the abutting member 120a, a higher reproducibility than a position reproduction mechanism by elastic member such as click (see FIG. 34, FIG. 35) can be obtained.

Figure 28:
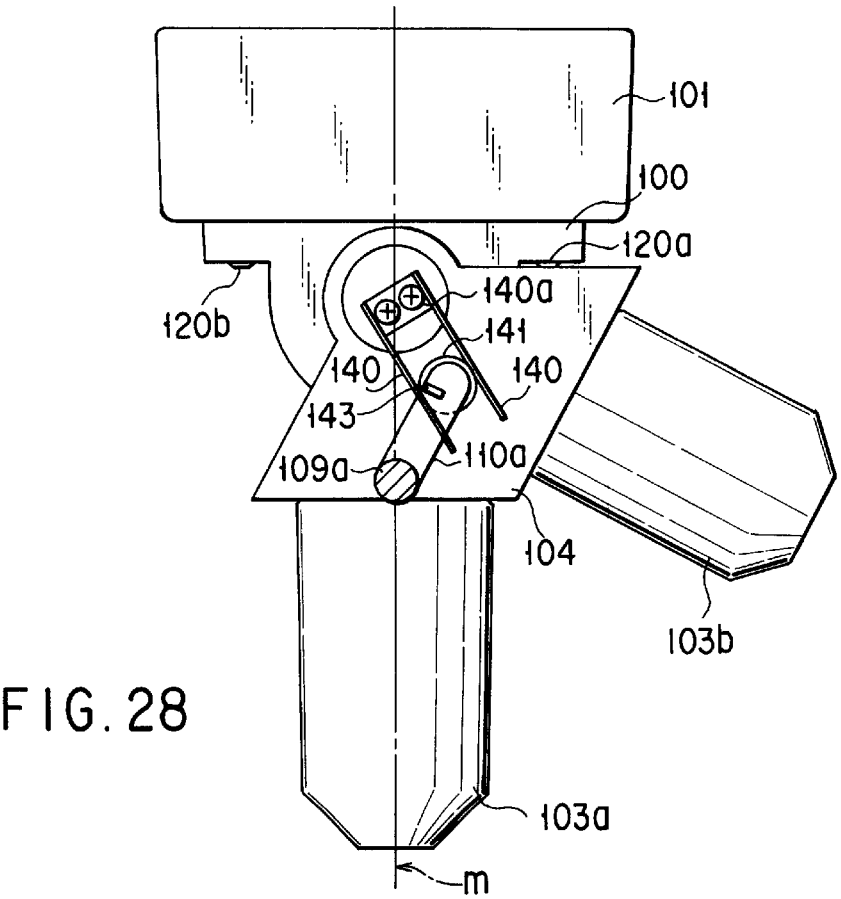

FIG. 28 shows the state where the bearing 141 is positioned not to bend the leaf spring 140, by rotating the output arm 110a counter-clockwise facing the drawing by the DC motor 109. Until FIGS. 26 and 27, the rotation member 104 does not rotate, even if the output arm 110a rotates, and only the stress of the leaf spring 140 holding the objective 103a on the optical axis m of the microscope reduces. Moreover, in FIG. 28, as the interval of two opposed faces of two leaf springs 140, 140 is smaller than the diameter of the bearing 141, the bearing 141 remains sandwiched between two leaf springs 140, 140.

Figure 29:
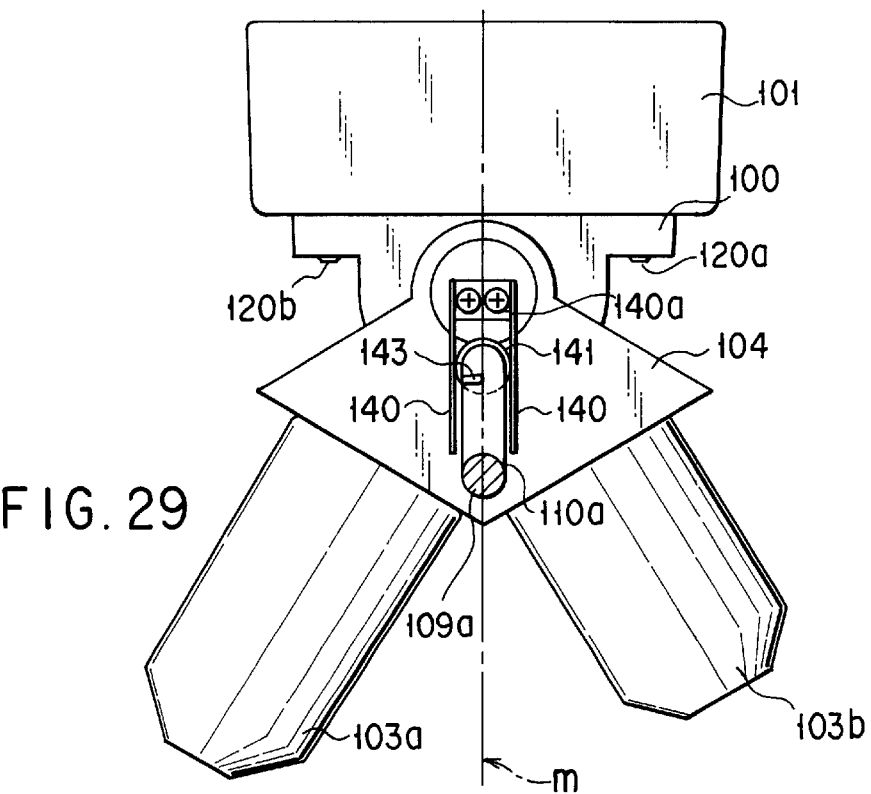

FIG. 29 shows the state where the rotation member 104 rotates from the state of FIG. 28 by the rotation of the output arm 110a. As mentioned before, when the rotation member 104 rotates, the bearing 141 on the output arm 110a and the leaf spring 140, 140 are always in contact, because the bearing 141 of the output arm 110a is sandwiched between two leaf springs 140, 140. Consequently, during the changeover operation of the rotation member 104, the changeover is performed smoothly, without interrupting the rotation operation, even if the DC motor 109 rpm may vary due to the eccentric load of the rotation member 104 (load eccentric to the rotation center).

Figure 30:
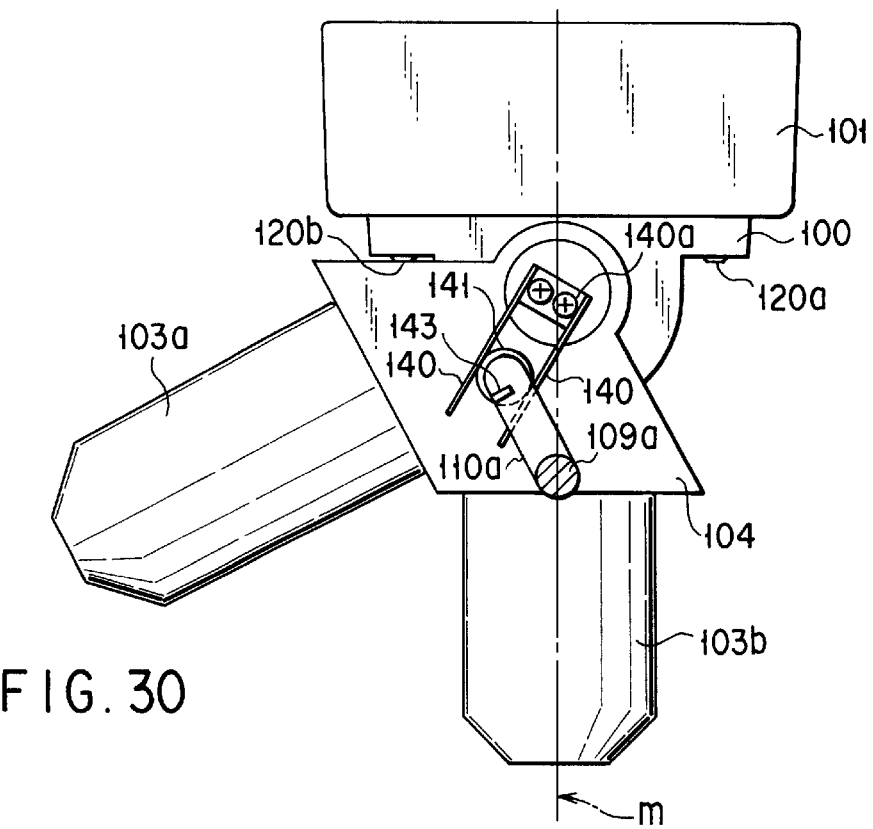

FIG. 30 shows the state where the output arm 110a rotates further, and the rotation member 104 abuts the abutting member 120b. For this abutting, the impact force is small and will not generate high noise nor large vibration, because only the inertia of the rotation member 104 acts, and the force of the leaf spring 140 for holding the objective 103b does not act. Here, as the shield plate 143 has not attained to the rotation angle sensor 144b, the DC motor 109 does not stop rotating. In addition, a high accuracy is not required for the rotation range of the DC motor 109, as it is limited by the abutting member 120b. Therefore, the apparatus assembly adjustment is obtained by the machine working precision and the adjustment of rotation angle sensor is not necessary.

Figure 31:
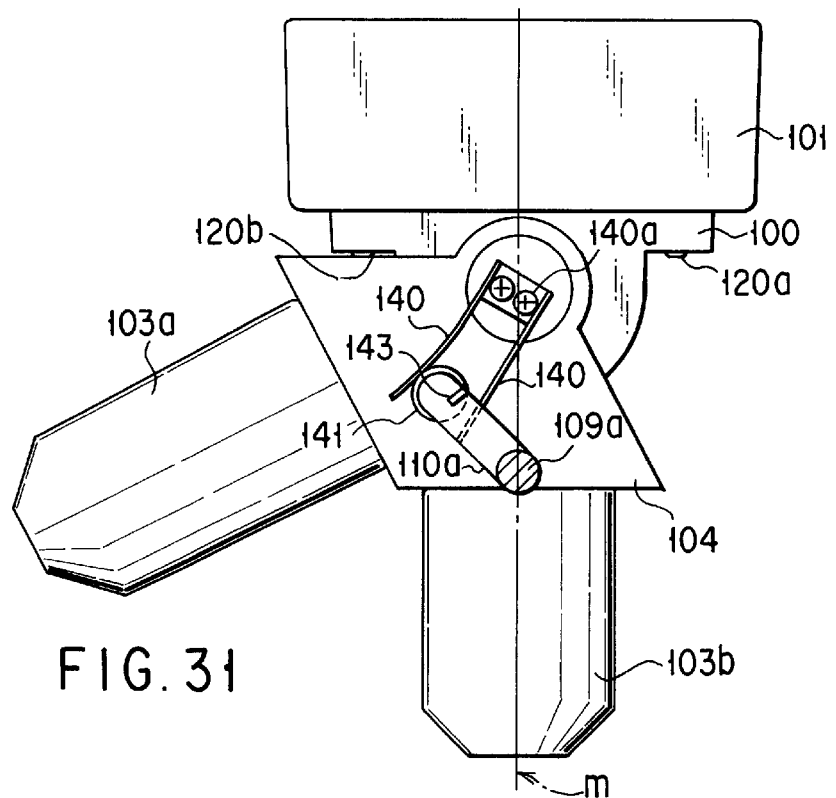

FIG. 31 shows the state where the DC motor 109 continues to rotates and the shield plate 143 is detected by the rotation angle sensor 144b, and the DC motor 109 stops rotating. As the DC motor 109 uses a motor having a relatively high deceleration ratio, the stress generated at the leaf spring 140 by the bearing 141 of the output arm 110a acts to apply the rotation member 104 to the abutting member 120b without rotating the DC motor 109. Therefore, the rotation member 104 can be kept applied to the abutting member 120b against the gravity force of the objective 103a or the like, namely, the objective 103b can be held at the state positioned on the optical axis m of the microscope.

Thus, in this objective changing-over apparatus, as the abutting impact by the collision of the rotation member onto the abutting member is little, the vibration due to objective changeover will be small, and can be attenuated rapidly, as the objective holding force can be increased.

Figure 32:
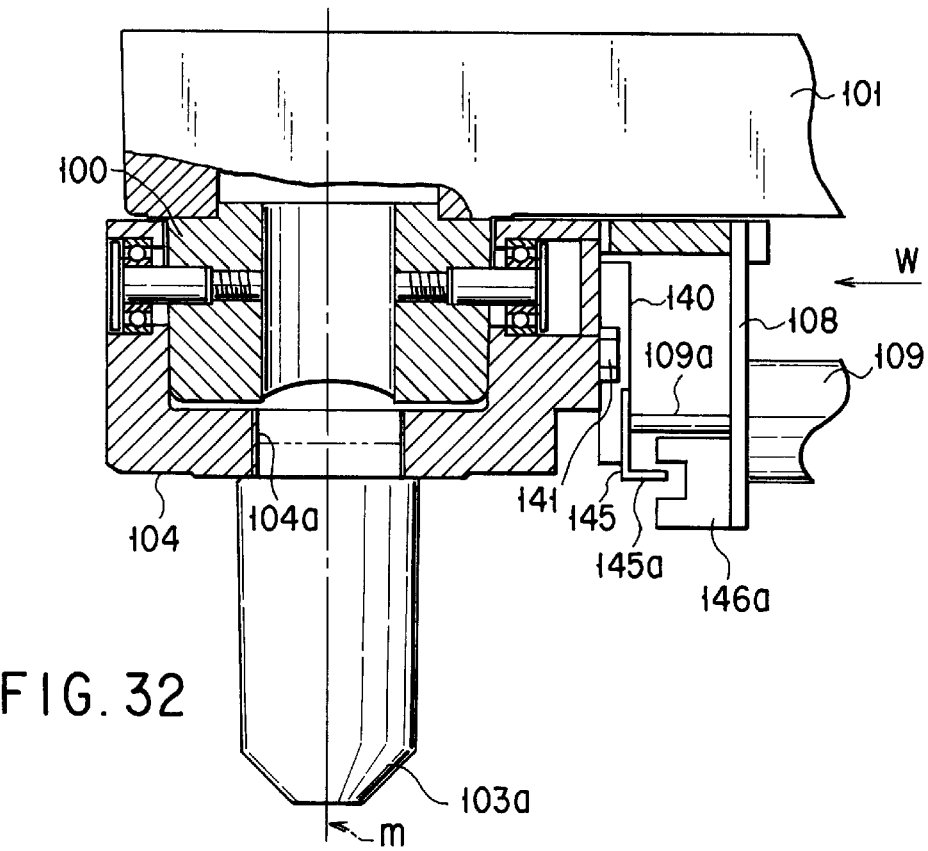
FIG. 32 is a partial side cross-section view showing the configuration of an objective changing-over apparatus according to the modification of the embodiment of the present invention.
Figure 33:
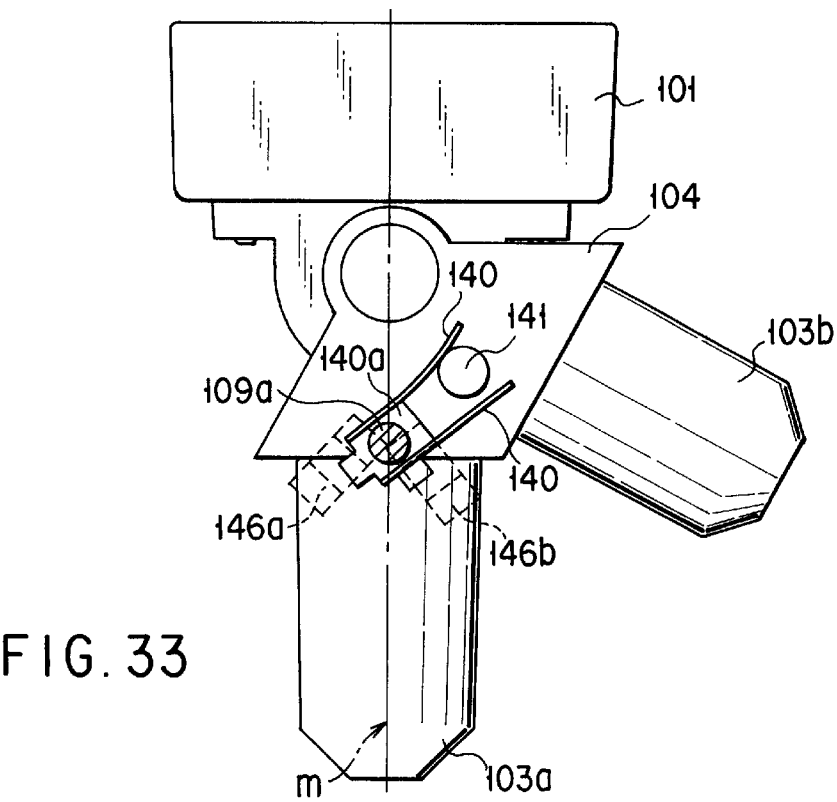
FIG. 33 is a view along W of FIG. 32.

FIG. 32 is a partial side cross-section view showing the configuration of an objective changing-over apparatus according to a modification of the fourth embodiment of the present invention. FIG. 33 is a view along W of FIG. 32.

In this objective changing-over apparatus, a bearing 141 is provided on a line dividing the angle made by respective center line of the objective attachment section 104a, 104b into two. Moreover, a connection section 140a connecting one ends of two opposed leaf springs 140, 140 is mounted on the output shaft 109a of the DC motor 109. These two leaf springs 140, 140 sandwich the bearing 141.

On the other hand, a shield plate (thin plate member) 145 having a bent section (thin plate member) 145a is mounted between the connection section 140a of the leaf springs 140, 140 and the output shaft 109a of the DC motor 109. Moreover, rotation angle sensors (photointerrupters) 146a, 146b for detecting the bent section 145a of the shield plate 145 are provided on the rotation member 104 side of the base 108. These rotation angle sensors 146a, 146b make an angle of about 90 degrees each other, larger than the rotation angle of 60 degrees of the rotation member 104, and are positioned to detect the bent section 145a. Such configuration also allows to obtain the same effect as the aforementioned fourth embodiment.

The present invention is not limited to the aforementioned respective embodiment, but can be realized by modifying conveniently without departing from the subject matter.

An objective changing-over apparatus according to the present invention allows to adopt two abutting members for abutting, stopping and positioning a rotation member as positioning mechanism, by employing two objectives mountable on the rotation member, and to enlarge the introduction range of objective positioning, by providing the transmission mechanism with a rotation area larger than the rotation range of the rotation member, to make the stopping accuracy of the driving source rough, and provide an economic equipment. Moreover, the endurance concerning objective positioning increases, and the driving source operation control becomes simple.

According to the objective changing-over apparatus of the present invention, the changeover provokes less impact and less vibration, because the force for keeping the objective retracted does not exert yet when the rotation member is applied to the abutting member, but exerts gradually during the following changeover operation. Therefore, the changeover causes less impact, reducing the fatigue of an operator observing for a long time and, moreover, presenting every possibility of improving the product durability remarkably.

In the objective changing-over apparatus of the present invention, objective changeover generates little impact, as the resistance against the force to rotate the objective in the gravity direction acts gradually after the objective changeover. The power transmission passage shows little backlash and the changeover operation is smooth, because the pin member comes into contact, sandwiched by elastic members. This allows to improve product quality and endurance. Obviously, it does not fatigue the operator, and moreover, an inexpensive apparatus can be supplied as the number of components is limited.

Thus, the present invention can provide an objective changing-over apparatus of simple configuration permitting to assembly and adjust easily, and to change over objectives securely by a simple control, independently of their fitting state variation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An objective changing-over apparatus, mounted on a microscope, for changing over two objectives on said microscope optical axis by electric power using a driving source, comprising:
    an attachment member to be fitted to said microscope;
    a rotation member to fit said two objectives rotatably supported by said attachment member via a rotation shaft;
    an abutting member restricting the rotation of said rotation member;
    a cam member having a long hole provided radially with respect to said rotation shaft of said rotation member; and
    a moving pin member engaged in said long hole of said cam member and biased by an elastic member;
    wherein said rotation member is rotated by turning said cam member by said driving source through said moving pin member, within the restriction range of said abutting member.

2. An objective change-over apparatus comprising:
    a rotation member which supports two objectives arranged so that optical axes thereof coincide on a plane which coincides with an optical axis of a microscope, and changes over the objectives so that a respective one of the optical axes of the objectives is made to coincide with the optical axis of the microscope by rotating the optical axes of the objectives on the plane which coincides with the optical axis of the respective one of the objectives;
    abutting members provided at two sites which correspond to positions where the optical axes of the objectives coincide respectively with the optical axis of the microscope and configured to limit the rotation of said rotation member when the objectives are changed over by said rotation member;
    a drive power source configured to generate a driving power for rotating said rotation member;
    a transmission mechanism including an elastic member and configured to transmit the driving power of said drive power source to said rotation member;
    a detection mechanism configured to detect a position where a rotation range of said drive power source converted into a rotation of said rotation member by said elastic member of said transmission mechanism which becomes larger than a rotatable range between said two abutting members to which said rotation member is abutted by changing-over by said rotation member; and
    a control member configured to stop said drive power source based on a result detected by said detection mechanism.

3. The objective change-over apparatus according to claim 2, wherein said transmission mechanism comprises:
    a power side rotation member configured to transmit a rotation power created by the driving power of said drive power source;
    a pin member provided at an eccentric position with respect to a rotation center of said power side rotation member; and
    a cam member including linear planes in contact with both side surfaces of said pin member and configured to rotate said rotation member by sliding said pin member rotated by said power side rotation member on said linear planes.

4. The objective change-over apparatus according to claim 3, wherein:
    said pin member is provided on a slide member supported to be linearly movable by said power side rotation member; and
    said elastic member is provided to urge said slide member provided on said power side rotation member.

5. The objective change-over apparatus according to claim 4, wherein:
    said elastic member applies, to said rotation member, a rotation power higher than a rotation power created by weights of said rotation member and said objectives themselves acting at a position where the optical axis of the respective one of said objectives and the optical axis of said microscope coincide with each other.

6. An objective change-over apparatus comprising:
    a rotation member which supports two objectives arranged so that optical axes thereof coincide on a plane which coincides with an optical axis of a microscope, and changes over the objectives so that a respective one of the optical axes of the objectives is made to coincide with the optical axis of the microscope supporting by rotating the optical axes of the objectives on the plane which coincides with the optical axis of the respective one of the objectives;
    abutting members provided at two sites which correspond to positions where the optical axes of the objectives coincide respectively with the optical axis of the microscope and configured to limit the rotation of said rotation member when the objectives are changed over by said rotation member;
    a drive power source configured to generate a driving power for rotating said rotation member; and
    a transmission mechanism including an elastic member and configured to transmit the driving power of said drive power source to said rotation member;
    wherein said drive power source is controlled so that a rotation range of said drive power source converted into a rotation of said rotation member by said elastic member of said transmission mechanism becomes larger than a rotatable range between said two abutting members to which said rotation member is abutted by changing-over by said rotation member.

* * * * *